US008563668B2

(12) United States Patent
Yamashita

(10) Patent No.: US 8,563,668 B2
(45) **Date of Patent: *Oct. 22, 2013**

(54) RESIN COMPOSITION FOR LASER ENGRAVING, RELIEF PRINTING PLATE PRECURSOR FOR LASER ENGRAVING AND PROCESS FOR PRODUCING SAME, AND PROCESS FOR MAKING RELIEF PRINTING PLATE

(75) Inventor: Katsuhiro Yamashita, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/169,636

(22) Filed: Jun. 27, 2011

(65) Prior Publication Data

US 2011/0319563 A1 Dec. 29, 2011

(30) Foreign Application Priority Data

Jun. 28, 2010 (JP) ................................ 2010-145889

(51) Int. Cl.

*C08F 285/00* (2006.01)
*C08K 5/24* (2006.01)
*G03C 1/00* (2006.01)

(52) U.S. Cl.

USPC .................. 525/477; 252/182.14; 430/281.1; 430/270.1; 524/261; 522/2

(58) Field of Classification Search

USPC ................. 525/61, 477; 252/182.14; 528/26; 427/144, 596; 430/281.1, 270.1, 286.1; 524/261; 522/2

See application file for complete search history.

(56) References Cited

U.S. PATENT DOCUMENTS

| | | | | | |
|---|---|---|---|---|---|
| 3,718,474 | A * | 2/1973 | Kolb et al. | .................... | 430/197 |
| 3,945,957 | A * | 3/1976 | Noshiro et al. | ................. | 524/66 |
| 4,539,232 | A * | 9/1985 | Burzynski et al. | ............ | 427/387 |
| 5,187,044 | A * | 2/1993 | Prioleau et al. | ............ | 430/271.1 |
| 7,425,347 | B2 * | 9/2008 | Takei et al. | .................. | 427/97.7 |
| 7,901,863 | B2 * | 3/2011 | Yamada et al. | ............ | 430/281.1 |
| 8,426,505 | B2 * | 4/2013 | Yoshida | ........................ | 524/265 |
| 8,431,637 | B2 * | 4/2013 | Yoshida | ........................ | 524/265 |
| 2001/0009129 | A1 * | 7/2001 | Kunita et al. | ................. | 101/453 |
| 2009/0246469 | A1 * | 10/2009 | Kawashima et al. | ......... | 428/156 |
| 2011/0156317 | A1 * | 6/2011 | Yoshida | ........................ | 264/400 |
| 2011/0293897 | A1 * | 12/2011 | Kawashima | ............... | 428/195.1 |

FOREIGN PATENT DOCUMENTS

| | | | |
|---|---|---|---|
| JP | 2003-533738 | A | 11/2003 |
| JP | 2004-506551 | A | 3/2004 |
| WO | 01/88615 | A1 | 11/2001 |
| WO | 02/16134 | A1 | 2/2002 |

* cited by examiner

*Primary Examiner* — Hannah Pak

(74) *Attorney, Agent, or Firm* — Sughrue Mion, PLLC

(57) ABSTRACT

A resin composition is provided that includes two or more types of compounds selected from the group consisting of (Component A) a compound comprising a silicon atom having a total of one or two alkoxy and hydroxy groups, (Component B) a compound comprising a silicon atom having a total of three alkoxy and hydroxy groups, and (Component C) a compound comprising a silicon atom having a total of four alkoxy and hydroxy groups. There are also provided a relief printing plate precursor that includes a relief-forming layer formed from the resin composition, a process for producing a relief printing plate precursor that includes a layer formation step of forming a relief-forming layer from the resin composition and a crosslinking step of thermally crosslinking the relief-forming layer so as to form a crosslinked relief-forming layer.

21 Claims, No Drawings

RESIN COMPOSITION FOR LASER ENGRAVING, RELIEF PRINTING PLATE PRECURSOR FOR LASER ENGRAVING AND PROCESS FOR PRODUCING SAME, AND PROCESS FOR MAKING RELIEF PRINTING PLATE

TECHNICAL FIELD

The present invention relates to a resin composition for laser engraving, a relief printing plate precursor for laser engraving and a process for producing same, and a process for making a relief printing plate.

BACKGROUND ART

There have been many proposals relating to the so-called 'direct engraving CTP method', in which a relief-forming layer is directly engraved by means of a laser (published Japanese translation 2003-533738 of a PCT application and published Japanese translation 2004-506551 of a PCT application). Unlike relief formation using an original image film, the direct engraving CTP method enables the relief shape to be freely controlled. Because of this, when an image such as an outline character is formed, it is possible to engrave that region more deeply than other regions, or in the case of a fine halftone dot image it is possible, taking into consideration resistance to printing pressure, to engrave while adding a shoulder, etc.

SUMMARY OF THE INVENTION

Problems to be Solved by the Invention

Among the above-mentioned relief printing plates, one having a soft relief layer is called a flexographic printing plate. In order to prepare a flexographic printing plate by direct engraving using a laser, it is necessary to carry out engraving at a depth of a few tens to a few hundreds of microns. In this process, a large amount of engraving residue is generated. Part of this engraving residue becomes attached to and accumulates on the flexographic printing plate during engraving. Once it has accumulated on the flexographic printing plate, residue might scatter during engraving due to centrifugal force caused by rotation of the printing plate. As a result, engraving residue sometimes causes contamination of engraving equipment. Furthermore, it is difficult to remove accumulated engraving residue by washing.

As a laser used with a laser engraving type flexographic printing plate, a high-output type carbon dioxide laser is often used. Furthermore, in response to a demand for smaller size and lower cost for laser engraving equipment, use of a visible and near-infrared light wavelength region semiconductor laser as a light source has been proposed. In this case, a flexographic printing plate is required to have high light absorption for visible light and near-infrared light. On the other hand, it is necessary for a relief layer of the flexographic printing plate to have a thickness of about 1 mm and have appropriate flexibility. Since it is difficult to photocure a film that has a thickness of about 1 mm and a high light absorption in the visible and near-infrared light wavelength region, a method involving thermal curing has been proposed. However, a flexographic printing plate having thermal curing properties has a problem with stability of flexibility over time.

It is an object of the present invention to provide a resin composition for laser engraving that can suppress scattering of residue during engraving, has excellent rinsing properties for engraving residue, and can form a relief-forming layer having excellent stability of flexibility over time, a relief printing plate precursor for laser engraving comprising a relief-forming layer formed from the resin composition for laser engraving, a process for producing a relief printing plate precursor for laser engraving, and a process for making a relief printing plate.

Means for Solving the Problems

The above-mentioned object of the present invention has been attained by the following means (1), (11), and (15).

(1) A resin composition for laser engraving, comprising two or more types of compounds selected from the group consisting of (Component A) a compound comprising a silicon atom having a total of one or two alkoxy and hydroxy groups, (Component B) a compound comprising a silicon atom having a total of three alkoxy and hydroxy groups, and (Component C) a compound comprising a silicon atom having a total of four alkoxy and hydroxy groups, (2) the resin composition for laser engraving according to (1), wherein Component A is a compound comprising two or more of said silicon atoms in one molecule, (3) the resin composition for laser engraving according to (1) or (2), wherein it comprises Component A and Component B, (4) the resin composition for laser engraving according to any one of (1) to (3), wherein Component B is a compound comprising only one of said silicon atom in one molecule, (5) the resin composition for laser engraving according to any one of (1) to (4), wherein Component A is a compound represented by Formula (A-1)

$$\{R^2_q(R^1O)_pSi\}_m\text{—}X \quad \text{(A-1)}$$

wherein p and q are integers of 1 or 2, p+q being 3 is satisfied, m is an integer of 1 to 10, X denotes an m-valent linking group, $R^1$ denotes a hydrogen atom or an alkyl group, and $R^2$ denotes an alkyl group, (6) the resin composition for laser engraving according to any one of (1) to (5), wherein Component B is a compound represented by Formula (B-1)

$$\{(R^3O)_3Si\}_n\text{—}Y \quad \text{(B-1)}$$

wherein n is an integer of 1 to 10, Y denotes an n-valent linking group, and $R^3$ denotes a hydrogen atom or an alkyl group, (7) the resin composition for laser engraving according to (5) or (6), wherein X and/or Y have 2 to 200 carbons, (8) the resin composition for laser engraving according to any one of (1) to (7), wherein it further comprises a hydroxy group-containing crosslinking polymer as (Component D) a binder polymer, (9) the resin composition for laser engraving according to any one of (1) to (8), wherein it further comprises (Component E) a chain-polymerizable monomer,

(10) the resin composition for laser engraving according to any one of (1) to (9), wherein it further comprises a compound having an acid dissociation constant for a conjugate acid of 11 to 13 as (Component I) a crosslinking catalyst for promoting formation of a crosslinked structure of Component A to Component C,

(11) a relief printing plate precursor for laser engraving, comprising a relief-forming layer comprising the resin composition for laser engraving according to any one of (1) to (10),

(12) the relief printing plate precursor for laser engraving according to (11), wherein it comprises a crosslinked relief-forming layer formed by crosslinking the relief-forming layer,

(13) the relief printing plate precursor for laser engraving according to (11) or (12), wherein it comprises a crosslinked relief-forming layer formed by thermally crosslinking the relief-forming layer,

(14) a process for producing a relief printing plate precursor for laser engraving, comprising a layer formation step of forming a relief-forming layer from the resin composition for laser engraving according to any one of (1) to (10) and a crosslinking step of thermally crosslinking the relief-forming layer so as to form a crosslinked relief-forming layer,

(15) a process for making a relief printing plate, comprising a layer formation step of forming a relief-forming layer from the resin composition for laser engraving according to any one of (1) to (10), a crosslinking step of thermally crosslinking the relief-forming layer so as to form a crosslinked relief-forming layer, and an engraving step of laser-engraving the crosslinked relief-forming layer so as to form a relief layer,

(16) the process for making a relief printing plate according to (15), wherein it further comprises a rinsing step of rinsing the engraved relief layer surface with water or a liquid containing water as a main component,

(17) the process for making a relief printing plate according to (16), wherein the liquid containing water as a main component comprises an amphoteric surfactant.

MODE FOR CARRYING OUT THE INVENTION

Resin Composition for Laser Engraving

The resin composition for laser engraving of the present invention comprises two or more types of compounds selected from the group consisting of (Component A) a compound comprising a silicon atom having a total of one or two alkoxy and hydroxy groups, (Component B) a compound comprising a silicon atom having a total of three alkoxy and hydroxy groups, and (Component C) a compound comprising a silicon atom having a total of four alkoxy and hydroxy groups.

The present invention is explained in detail below.

In the present invention, the notation 'lower limit to upper limit', which expresses a numerical range, means 'at least the lower limit but no greater than the upper limit'. That is, they are numerical ranges that include the upper limit and the lower limit.

In order to impart strength and flexibility as a flexographic printing plate (hereinafter, also called a flexographic plate), the resin composition for laser engraving of the present invention comprises two or more types of compounds selected from the group consisting of Component A to Component C (hereinafter, Component A to Component C are together also called 'alkoxysilane compounds'). Self-condensation of alkoxysilane compounds, preferably crosslinking with a binder polymer, can impart mechanical strength and flexibility to a relief layer of a flexographic printing plate.

Crosslink density is directly related to flexibility of a relief layer. As the crosslink density increases, the glass transition temperature of a relief (-forming) layer increases and flexibility is lost. Furthermore, when the density of crosslinkable groups increases, uncrosslinked crosslinkable groups easily remain in a relief-forming layer or a relief layer (hereinafter, also expressed as a 'relief (-forming) layer'). In this case, since crosslinking progresses during storage, flexibility is easily lost. It is therefore undesirable to excessively increase the density of crosslinkable groups in terms of the printing properties of a flexographic printing plate.

On the other hand, it has become clear during examination of the present invention that the properties of post-engraving residue are also affected by the crosslink density of the alkoxysilane compounds. It has been found that, when the crosslink density of the alkoxysilane compounds in the residue component is low, the glass transition temperature of the residue becomes low, and liquid-state low-viscosity residue accumulates on the relief layer. Such liquid-state low-viscosity residue can scatter within engraving equipment by virtue of centrifugal force caused by drum rotation during engraving. As described above, the requirements for the crosslink density of the relief (-forming) layer and the crosslink density of the residue are contradictory, and there is a desire for a method that can simultaneously satisfy these requirements.

The present inventors have carried out an investigation focusing attention on the number of alkoxy groups and hydroxy groups as substituents bonded to a silicon atom contained in an alkoxysilane compound. As a result, it has become possible to achieve flexibility of a relief layer and prevention of scattering of residue due to it being in a liquid state by means of a resin composition for laser engraving comprising two or more types of compounds selected from the group consisting of (Component A) a compound comprising a silicon atom having a total of one or two alkoxy and hydroxy groups, (Component B) a compound comprising a silicon atom having a total of three alkoxy and hydroxy groups, and (Component C) a compound comprising a silicon atom having a total of four alkoxy and hydroxy groups.

(Component A) to (Component C) are each explained below.

In the present invention, a group bonded to a silicon atom in Component A to Component C is restricted to an alkoxy group and a hydroxy group. However, it is possible to employ, instead of these groups, a hydrolyzable group such as an aryloxy group, a mercapto group, a halogen atom, an amide group, an acetoxy group, an amino group, or an isopropenoxy group. Furthermore, with regard to Component A, other than an alkoxy group and a hydroxy group, an alkyl group is preferably bonded as a non-hydrolyzable substituent. Moreover, Component A to Component C in the present invention are preferably compounds not having a polymerizable group such as an ethylenically unsaturated bond.

(Component A) Compound Comprising Silicon Atom Having Total of One or Two Alkoxy and Hydroxy Groups As long as Component A comprises a silicon atom having a total of 1 or 2 alkoxy and hydroxy groups (hereinafter, also called 'alkoxy groups, etc.'), it may contain another silicon atom that does not correspond to said silicon atom, but it is preferably a compound comprising only a silicon atom having a total of 1 or 2 alkoxy groups, etc. as a silicon atom.

The group other than the alkoxy groups, etc. bonded to a silicon atom is preferably not the above-mentioned hydrolyzable group, and is preferably an alkyl group.

When Component A comprises two or more of said silicon atoms, the type and number of alkoxy groups, etc. bonded to said silicon atoms and the type and number of groups other than the alkoxy groups, etc. are preferably the same.

Component A is preferably a compound represented by Formula (A-1).

$$\{R^2_q(R^1O)_pSi\}_m—X \qquad (A-1)$$

(In Formula (A-1), p and q are integers of 1 or 2, p+q being 3 is satisfied, m is an integer of 1 to 10, X denotes an m-valent linking group, $R^1$ denotes a hydrogen atom or an alkyl group, and $R^2$ denotes an alkyl group.)

Here, the m ps and qs independently denote an integer of 1 or 2, and for each silicon atom the relationship of p+q being 3 is satisfied. p is preferably 2 since a balance can be achieved between reactivity and flexibility of a crosslinked film that is formed. When p is 2, the $R^1$s may be identical to or different from each other, but are preferably identical.

$R^1$ denotes a hydrogen atom or an alkyl group, preferably an alkyl group having 1 to 10 carbons, more preferably a methyl group, an ethyl group, an n-propyl group, an i-propyl group, or an n-butyl group, and yet more preferably a methyl group or an ethyl group.

$R^2$ denotes an alkyl group. When q is 2, the $R^2$s may be identical to or different from each other, but are preferably identical. $R^2$ is preferably an alkyl group having 1 to 10 carbons, more preferably a methyl group, an ethyl group, an n-propyl group, an i-propyl group, or an n-butyl group, and yet more preferably a methyl group or an ethyl group.

That is, said silicon atom of the silyl group of Component A has a total of 1 or 2 alkoxy or hydroxy groups, and preferably 2, and in this case the remaining one of the three substituents bonded to the silyl group is preferably an alkyl group.

Specific preferred examples of the $R^2_q(R^1O)_pSi$ group include dialkoxymonoalkylsilyl groups such as a dimethoxymethylsilyl group and a diethoxymethylsilyl group; and monoalkoxydialkylsilyl groups such as a methoxydimethylsilyl group and an ethoxydimethylsilyl group.

Furthermore, m denotes an integer of 1 to 10, preferably 2 or greater, more preferably 2 to 6, yet more preferably 2 or 3, and particularly preferably 2. For crosslinking a binder, it is preferable for m to be 2 or greater, but when m is 7 or greater, the binder crosslinking tends to progress excessively, and the film hardness becomes too high.

That is, Component A preferably has, in one molecule, 2 or more, more preferably 2 or 3, and particularly preferably 2, silicon atoms having a total of 1 or 2 alkoxy or hydroxy groups.

X denotes an m-valent linking group. X is preferably an aliphatic group, an aromatic group, a heterocyclic group, an ether bond (—O—), a sulfur atom (—S—), an imino group (—N(R)—), a carbonyl group (—CO—), a sulfinyl group (—SO—), a sulfonyl group ($—SO_2—$), or a combination thereof. Examples of the substituent R include a hydrogen atom, an alkyl group, an aryl group, an alkenyl group, an alkynyl group, and an aralkyl group. R may be a divalent linking group formed by further removing one hydrogen atom from R.

The aliphatic group is preferably an alkylene group having 1 to 20 carbons.

The aromatic group is preferably an arylene group having 6 to 20 carbons.

The number of carbons contained in X is preferably 2 to 200, more preferably 6 to 100, and yet more preferably 10 to 50. When in the above-mentioned numerical range, a relief (-forming) layer having excellent flexibility and stability of flexibility over time is obtained.

X preferably contains an ether bond (—O—), a sulfur atom (—S—), an imino group (—N(R)—), or a carbonyl group (—CO—), and from the viewpoint of removability (rinsing properties) of engraving residue, it is more preferable for it to contain an ester bond (—OCO— or —COO—), a urethane bond (—OCON(R)— or —N(R)COO—), an ether bond (in particular, an ether bond contained in an oxyalkylene group), or a urea bond (—N(R)CON(R)—), which are easily decomposed by aqueous alkali. R has the same meaning as R in the above-mentioned imino group (—N(R)—), and is preferably a hydrogen atom.

The oxyalkylene group is preferably a polyoxyalkylene group in which 2 to 40 oxyalkylene groups are connected, and is more preferably a polyoxyalkylene group in which 4 to 20 thereof are connected. The alkylene group contained in the oxyalkylene group is preferably an alkylene group having 2 to 10 carbons, more preferably an alkylene group having 2 to 4 carbons, and yet more preferably an ethylene group.

X is preferably a polyoxyethylene chain-containing linking group, more preferably a linking group having a phenylene group and a polyoxyethylene chain in combination, and yet more preferably a linking group having a phenylene group, a polyoxyethylene chain, and an ester bond (—OCO— or —COO—) in combination. It is yet more preferably a urea bond- or sulfur atom-containing linking group, and particularly preferably a urea bond-containing linking group.

A sulfur atom-containing Component A functions as a vulcanizing agent or a vulcanization accelerator when a vulcanization treatment is carried out. When the binder polymer is for example a conjugated diene monomer unit-containing polymer, a polymer reaction (crosslinking) is promoted. As a result, rubber elasticity necessary as a relief printing plate is exhibited. Furthermore, the strength of the crosslinked relief-forming layer and the relief layer is improved.

Specific examples of Component A are listed below, but it should not be construed as being limited thereto.

(Component A)

(a-1)

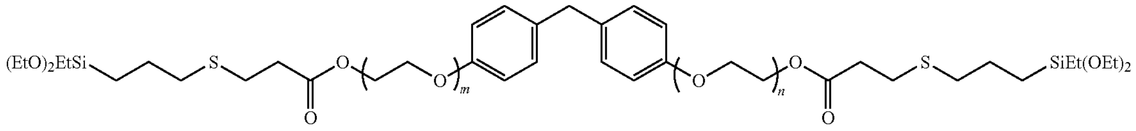

m + n = 4

(a-2)

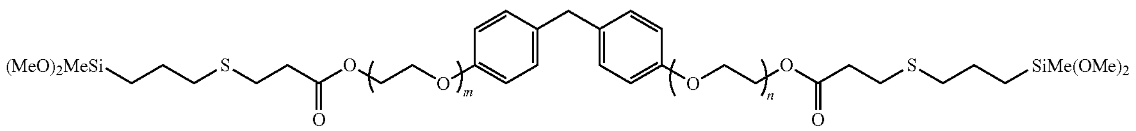

m + n = 10

-continued
(a-3)
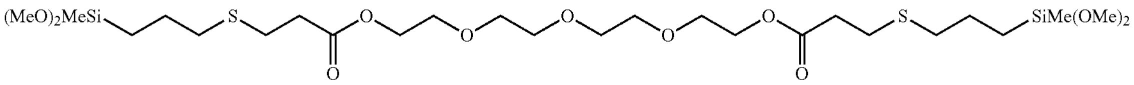
(a-4)
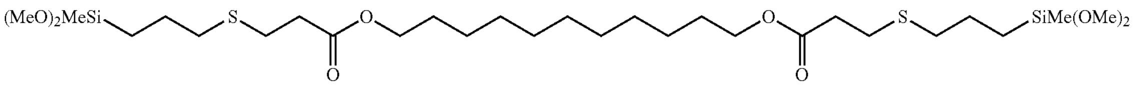
(a-5)
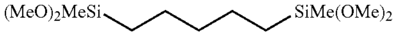
(a-6)
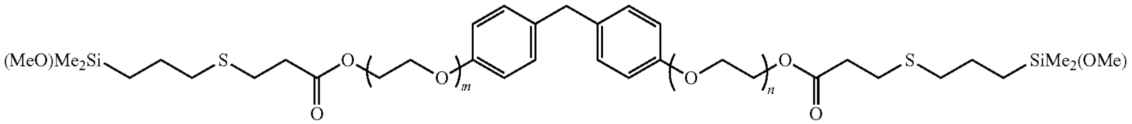
m + n = 10
(a-7)
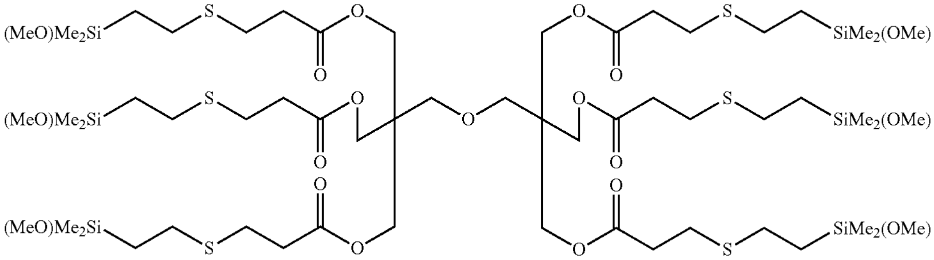
(a-8)
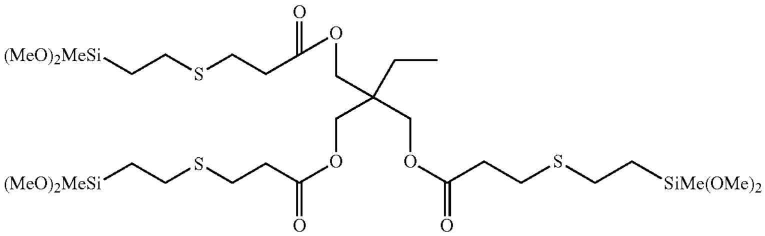
(a-9)
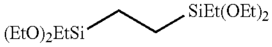
(a-10)
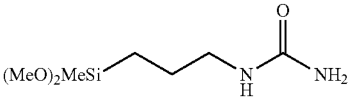
(a-11)
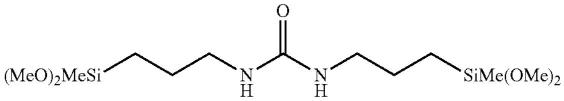
(a-12)
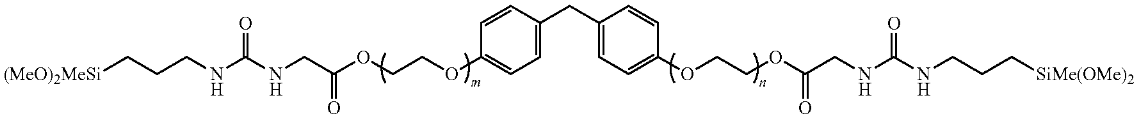
m + n = 4
(a-13)
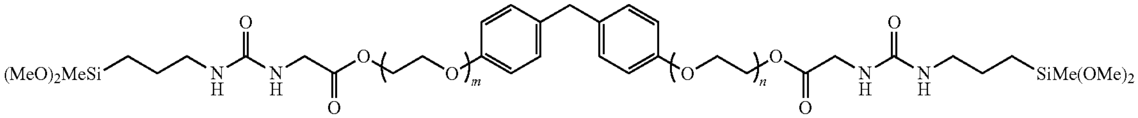
m + n = 10

(Component B) Compound Comprising Silicon Atom Having Total of Three Alkoxy and Hydroxy Groups As long as Component B comprises a silicon atom having a total of three alkoxy and hydroxy groups (hereinafter, also called 'alkoxy groups, etc.'), it may contain another silicon atom that does not correspond to said silicon atom, but is preferably a compound comprising only a silicon atom having a total of three alkoxy groups, etc. as a silicon atom.

When Component B comprises two or more of said silicon atoms, the type and number of alkoxy groups, etc. bonded to said silicon atoms are preferably the same.

Component B is preferably a compound represented by Formula (B-1).

$$\{(R^3O)_3Si\}_n—Y \qquad (B-1)$$

(In Formula (B-1), n is an integer of 1 to 10, Y denotes an n-valent linking group, and $R^3$ denotes a hydrogen atom or an alkyl group.)

$R^3$ denotes a hydrogen atom or an alkyl group. The three $R^3$s may be identical to or different from each other, but are preferably identical. $R^3$ is preferably a hydrogen atom or an alkyl group having 1 to 10 carbons, more preferably a methyl group, an ethyl group, an n-propyl group, an i-propyl group, or an n-butyl group, and particularly preferably a methyl group or an ethyl group.

Furthermore, n denotes an integer of 1 to 10. n is preferably 1 to 4, more preferably 1 to 3, yet more preferably 1 or 2, and particularly preferably 1. That is, Component B is preferably a compound comprising one silicon atom having a total of three alkoxy and hydroxy groups in one molecule.

Y denotes an n-valent linking group. Y is preferably an aliphatic group, an aromatic group, a heterocyclic group, an ether bond (—O—), a sulfur atom (—S—), an imino group (—N(R)—), a carbonyl group (—CO—), a sulfinyl group (—SO—), a sulfonyl group (—$SO_2$—), or a combination thereof. Examples of the substituent R include a hydrogen atom, an alkyl group, an aryl group, an alkenyl group, an alkynyl group, and an aralkyl group. R may be a divalent linking group formed by further removing one hydrogen atom from R.

The number of carbons contained in Y is preferably 2 to 200, more preferably 2 to 100, yet more preferably 3 to 80 and particularly preferably 4 to 10.

Y preferably contains an ether bond (—O—), a sulfur atom (—S—), an imino group (—N(R)—), or a carbonyl group (—CO—), and from the viewpoint of removability (rinsing properties) of engraving residue, it is more preferable for it to contain an ester bond (—OCO— or —COO—), a urethane bond (—OCON(R)— or —N(R)COO—), an ether bond (in particular, an ether bond contained in an oxyalkylene group), or a urea bond (—N(R)CON(R)—), which are easily decomposed by aqueous alkali. R has the same meaning as R in the above-mentioned imino group (—N(R)—), and is preferably a hydrogen atom.

Furthermore, the oxyalkylene group has the same meaning as the oxyalkylene group in Component A and the preferred ranges are also the same. In the present invention, Y is particularly preferably the group having the urea bond (—N(R)CON(R)—).

When Component B is a compound comprising one silicon atom having a total of three alkoxy groups, the number of carbons of Y is preferably 4 to 10. Furthermore, Y is preferably a urea bond-containing group, and more preferably a group formed from an alkylene group and a urea bond.

When Component B is a compound comprising 2 or 3 silicon atoms having a total of three alkoxy groups, etc., the number of carbons of Y is preferably 10 to 50, and more preferably 12 to 45.

Furthermore, Y is preferably a urea bond-containing linking group, more preferably a linking group further having a polyoxylene chain in combination, yet more preferably a linking group further having an ester bond (—OCO— or —COO—) in combination, and particularly preferably a linking group further having a phenylene group in combination.

Specific examples of Component B are listed below, but it should not be construed as being limited thereto.

(Component B)

(b-1)

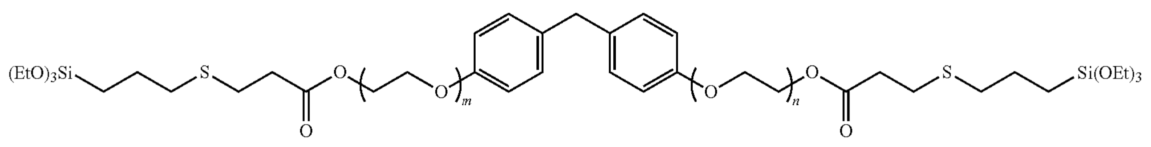

m + n = 4

(b-2)

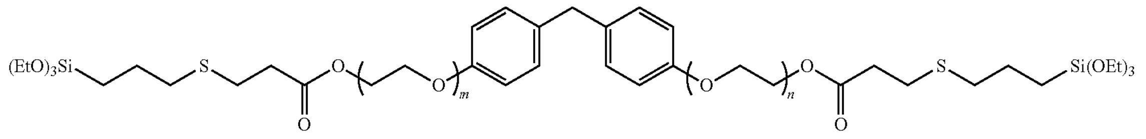

m + n = 10

(b-3)

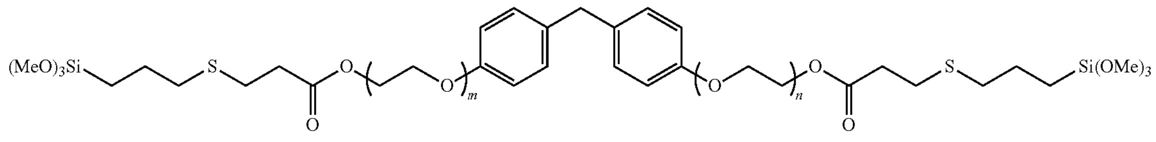

m + n = 16

-continued
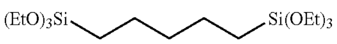
(b-4)
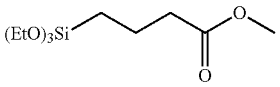
(b-5)
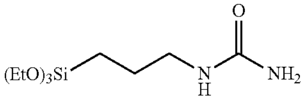
(b-6)
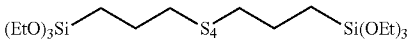
(b-7)
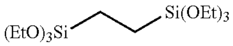
(b-8)
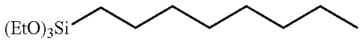
(b-9)
(b-10)
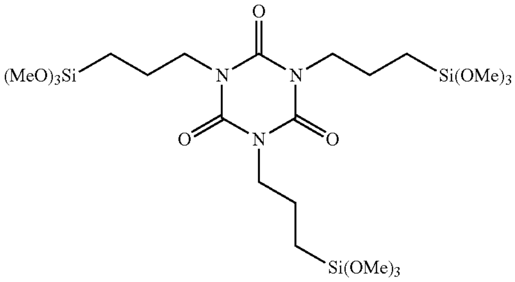
(b-11)
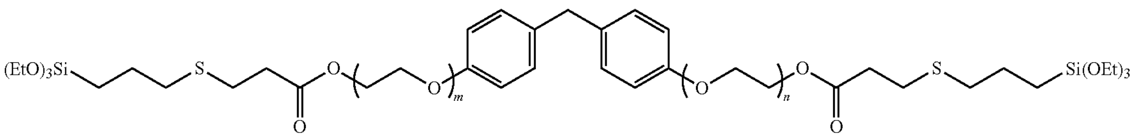
m + n = 22
(b-12)
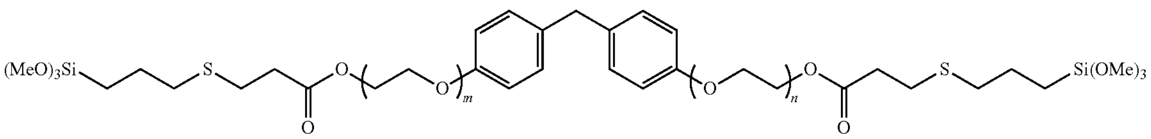
m + n = 22
(b-13)
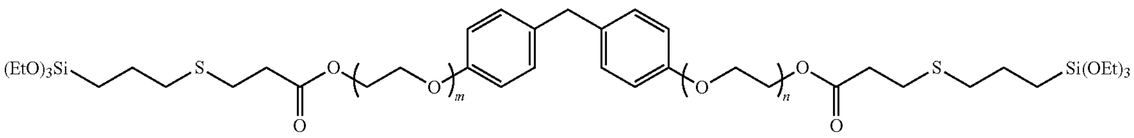
m + n = 32
(b-14)
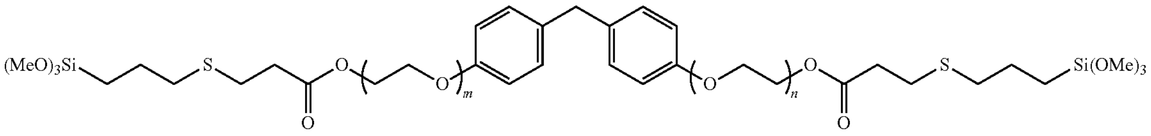
m + n = 32
(b-15)
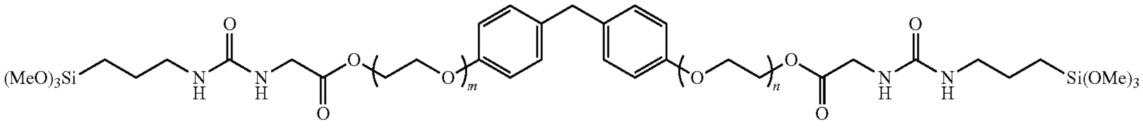
m + n = 4

-continued (b-16)

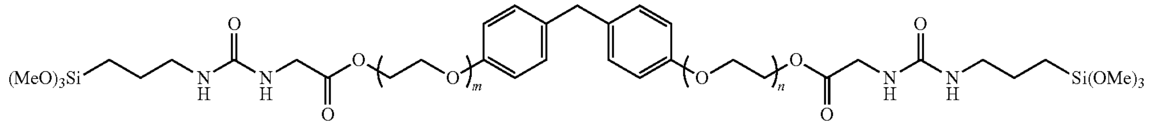

m + n = 10

(Component C) Compound Comprising Silicon Atom Having Total of Four Alkoxy and Hydroxy Groups Component C is preferably a compound represented by Formula (C-1).

$$(R^4O)_4Si \qquad (C\text{-}1)$$

(In Formula (C-1), $R^4$ denotes a hydrogen atom or an alkyl group.)

The four $R^4$s may be identical to or different from each other, but are preferably identical. $R^4$ is preferably a methyl group, an ethyl group, an n-propyl group, an i-propyl group, or an n-butyl group, and particularly preferably an ethyl group, an n-propyl group, or an i-propyl group.

Specific examples of Component C are described below but are not limited thereto.

(Component C)

$$Si(OEt)_4 \qquad (c\text{-}1)$$

$$Si(O\mathit{i}\text{—}Pr)_4 \qquad (c\text{-}2)$$

From the viewpoint of rinsing properties, the total content of the alkoxysilane compounds is preferably 2 to 40 wt % relative to the total solids content weight of the resin composition for laser engraving, more preferably 5 to 30 wt %, and yet more preferably 8 to 25 wt %.

The combination of Component A to Component C may be a combination of two or more types selected from the group consisting of Component A to Component C, and from the viewpoint of flexibility and stability of flexibility over time of a relief layer, a combination of Component A and Component B and a combination of Component A and Component C are preferable. From the viewpoint of stability of flexibility over time, a combination of Component A and Component B is more preferable.

In these combinations, the constitution of Component A to Component C is preferably as follows.

From the viewpoint of flexibility of the relief layer and stability of flexibility over time, the proportion of Component A among the total weight of the alkoxysilane compounds is preferably 40 to 95 wt %, more preferably 50 to 90 wt %, and yet more preferably 60 to 85 wt %.

From the viewpoint of flexibility of the relief layer and stability of flexibility over time, the proportion of Component B among the total weight of the alkoxysilane compounds is preferably 5 to 80 wt %, more preferably 10 to 50 wt %, and yet more preferably 20 to 40 wt %.

From the viewpoint of stability of flexibility over time, the proportion of Component C among the total weight of the alkoxysilane compounds is preferably 5 to 40 wt %, more preferably 10 to 30 wt %, and yet more preferably 15 to 25 wt %.

From the viewpoint of rinsing properties and flexibility, the ratio (Component A/Component B) of Component A and Component B is preferably 0.5 to 50, more preferably 1 to 20, and yet more preferably 2 to 10. From the viewpoint of rinsing properties and flexibility, the ratio (Component A/Component C) of Component A and Component C is preferably 1 to 50, more preferably 2 to 20, and yet more preferably 5 to 10. From the viewpoint of rinsing properties and flexibility, the ratio (Component B/Component C) of Component B and Component C is preferably 1 to 50, more preferably 2 to 20, and yet more preferably 5 to 10.

(Component D) Binder Polymer

The resin composition for laser engraving of the present invention preferably comprises (Component D) a binder polymer.

(Component D) the binder polymer is a polymer binder resin having a molecular weight of 500 to 1,000,000. As Component D, a crosslinking polymer having a crosslinking group which reacts with Component A to Component C (hereinafter it is called a crosslinking polymer) is preferable. In particular, from the viewpoint of using the resin composition for laser engraving in a relief forming layer of the relief printing plate precursor for laser engraving, it is preferable that the binder polymer is selected while taking into consideration various aspects of performance such as laser engraving properties, ink acceptance properties, and engraving residue dispersibility.

The binder polymer may be selected from a polystyrene resin, polyester resin, polyamide resin, polyurea resin, polyamide imide resin, polyurethane resin, polysulfone resin, polyether sulfone resin, polyimide resin, polycarbonate resin, hydroxyethylene unit-containing hydrophilic polymer, acrylic resin, acetal resin, epoxy resin, polycarbonate resin, rubber, and thermoplastic elastomer, etc. and a crosslinking polymer having a group which reacts with Component A to Component C may be preferably used by selecting.

The crosslinking polymer preferably has a glass transition temperature (Tg) of at least 20° C. From the viewpoint of mechanical properties of a crosslinked relief-forming layer, it is preferable that the crosslinking polymer has a glass transition temperature (Tg) of at least 20° C. (room temperature). In this case, engraving sensitivity is also improved when combined with a photothermal conversion agent, which is described later. The binder polymer having such a glass transition temperature is called a non-elastomer below. That is, an elastomer is generally a polymer having a glass transition temperature of no greater than 20° C. (room temperature) (ref. Kagaku Dai Jiten $2^{nd}$ edition (Science Dictionary), Foundation for Advancement of International Science, Maruzen, P. 154).

The upper limit for the glass transition temperature of the crosslinking polymer is not limited, but is preferably no greater than 200° C. from the viewpoint of ease of handling, more preferably at least 20° C. but no greater than 200° C., and particularly preferably at least 25° C. but no greater than 120° C.

When a polymer having a glass transition temperature of 20° C. (room temperature) or greater is used as a crosslinking polymer, the crosslinking polymer is in a glass state at normal temperature. Because of this, compared with a case of the rubber state, thermal molecular motion is suppressed. In laser engraving, in addition to the heat given by a laser during laser irradiation, heat generated by the function of a photothermal conversion agent added as desired is transmitted to the surrounding crosslinking polymer, and this polymer is thermally decomposed and disappears, thereby forming an engraved recess.

In a preferred embodiment of the present invention, it is surmised that when a photothermal conversion agent is present in a state in which thermal molecular motion of a crosslinking polymer is suppressed, heat transfer to and thermal decomposition of the crosslinking polymer occur effectively. It is anticipated that such an effect further increases the engraving sensitivity.

Polymer Compound Having One or More Types of Substituent Selected from Group Consisting of Hydroxy Group and —NHR The crosslinking polymer is preferably a crosslinking polymer having one or more types of substituent selected from the group consisting of a hydroxy group and —NHR. Here, R denotes a hydrogen atom, a straight-chain or branched alkyl group, alkenyl group, alkynyl group, a cycloalkyl group, an alkoxy group, an aryl group, or a heterocyclic group.

R in a substituent —NHR includes an alkyl group having 1 to 20 carbons as a straight-chain or branched chain alkyl group, an alkenyl group having 2 to 20 carbons as an alkenyl group, an alkynyl group having 2 to 20 carbons as an alkynyl group, a cycloalkyl group having 2 to 7 carbons as a cycloalkyl group, an alkoxy group having 1 to 20 carbons as an alkoxy group, and an aryl group having 6 to 20 carbons as an aryl group. Among them, as R, a hydrogen, a straight-chain or branched chain alkyl group having 1 to 5 carbons, an alkoxy group having 1 to 5 carbons, and an aryl group having 6 to 12 carbons are preferable.

The polymer skeleton of the crosslinking polymer is not particularly limited; examples thereof include polyether, polyester, polyamide, polyurea, polyurethane, polysiloxane, an acrylic resin, an epoxy resin, and a polymer of a vinyl monomer (hereinafter, also called a vinyl polymer). In the present invention an acrylic resin denotes a polymer having at least one type of (meth)acrylic monomer as a polymerization component.

The substitution position of the hydroxy group and —NHR in the crosslinking polymer is not particularly limited; examples thereof include an embodiment in which it is present at a main chain terminal or in a side chain of the crosslinking polymer. From the viewpoint of reactivity, ease of synthesis, etc. the crosslinking polymer is preferably a polymer having the above group in a side chain. A crosslinking polymer having a hydroxy group is also preferable.

As the crosslinking polymer, one in which a polymer such as polybutadiene, polyisoprene, or a polyolefin has its terminal hydroxylated is also preferably used. Such polymers are commercially available, and examples thereof include the Poly bd (registered trademark), Poly ip (registered trademark), Epol (registered trademark), and KRASOL series manufactured by Idemitsu Kosan Co., Ltd.

Among the crosslinking polymers, a polymer compound having a hydroxy group in a polymer side chain is now explained.

Preferred examples of the polymer compound having a hydroxy group in a polymer side chain include an acrylic resin having a hydroxy group in a side chain, an epoxy resin having a hydroxy group in a side chain, a polyester having a hydroxy group in a side chain, and a vinyl polymer having a hydroxy group in a side chain.

As an acrylic monomer used in synthesis of the acrylic resin having a hydroxy group in a side chain, for example, a (meth)acrylic acid ester, a crotonic acid ester, or a (meth) acrylamide that has a hydroxy group in the molecule is preferable. Specific examples of such a monomer include 2-hydroxyethyl (meth)acrylate, 2-hydroxypropyl (meth)acrylate, and 4-hydroxybutyl (meth)acrylate.

As the polymer compound having a hydroxy group in a polymer side chain, a copolymer formed by polymerization between the above monomer and a known (meth)acrylic monomer or vinyl-based monomer may preferably be used.

As the (meth)acrylic monomer a (meth)acrylic acid ester can be cited, and specific examples thereof include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth) acrylate, lauryl (meth)acrylate, 2-ethylhexyl (meth)acrylate, acetoxyethyl (meth)acrylate, phenyl (meth)acrylate, 2-methoxyethyl (meth)acrylate, 2-ethoxyethyl (meth)acrylate, 2-(2-methoxyethoxy)ethyl (meth)acrylate, cyclohexyl (meth) acrylate, t-butylcyclohexyl (meth)acrylate, benzyl (meth) acrylate, diethylene glycol monomethyl ether (meth)acrylate, diethylene glycol monoethyl ether (meth)acrylate, diethylene glycol monophenyl ether (meth)acrylate, triethylene glycol monomethyl ether (meth)acrylate, triethylene glycol monoethyl ether (meth)acrylate, dipropylene glycol monomethyl ether (meth)acrylate, polyethylene glycol monomethyl ether (meth)acrylate, polypropylene glycol monomethyl ether (meth)acrylate, the monomethyl ether (meth)acrylate of a copolymer of ethylene glycol and propylene glycol, N,N-dimethylaminoethyl (meth)acrylate, N,N-diethylaminoethyl (meth)acrylate, and N,N-dimethylaminopropyl (meth)acrylate.

Furthermore, a modified acrylic resin formed with a urethane group- or urea group-containing acrylic monomer may preferably be used.

Among these, from the viewpoint of aqueous ink resistance, an alkyl (meth)acrylate such as lauryl (meth)acrylate and an aliphatic cyclic structure-containing (meth)acrylate such as t-butylcyclohexyl (meth)acrylate are particularly preferable.

Specific example of an epoxy resin having a hydroxy group in a side chain includes an epoxy resin formed by polymerization, as a starting material monomer, of an adduct of bisphenol A and epichlorohydrin. The epoxy resin preferably has a weight-average molecular weight of at least 800 but no greater than 200,000, and a number-average molecular weight of at least 400 but no greater than 60,000.

As a polyester resin, a hydroxycarboxylic acid unit-containing polyester resin such as polylactic acid may preferably be used. As such a polyester resin, specifically, one selected from the group consisting of a polyhydroxyalkanoate (PHA), a lactic acid-based polymer, polyglycolic acid (PGA), polycaprolactone (PCL), poly(butylene succinate), derivatives thereof, and mixtures thereof is preferable.

Furthermore, as a hydroxyethylene unit-containing vinyl-based polymer, polyvinyl alcohol (PVA) and derivatives thereof are preferably used.

Examples of the PVA derivatives include an acid-modified PVA in which at least some of the hydroxy groups of the hydroxyethylene units are modified with an acid group such as a carboxy group, a modified PVA in which some of the hydroxy groups are modified with a (meth)acryloyl group, a modified PVA in which at least some of the hydroxy groups are modified with an amino group, a modified PVA in which at least some of the hydroxy groups have introduced thereinto ethylene glycol, propylene glycol, or a multimer thereof, and a polyvinyl acetal obtained by treating polyvinyl alcohol with an aldehyde.

Among these, polyvinyl acetal is particularly preferably used.

The polyvinyl acetal is a compound obtained by converting polyvinyl alcohol (obtained by saponifying polyvinyl acetate) into a cyclic acetal.

The acetal content in the polyvinyl acetal (mole % of vinyl alcohol units converted into acetal with the total number of moles of vinyl acetate monomer starting material as 100 mole %) is preferably 30 to 90 mole %, more preferably 50 to 85 mole %, and particularly preferably 55 to 78 mole %.

The vinyl alcohol unit in the polyvinyl acetal is preferably 10 to 70 mole % relative to the total number of moles of the vinyl acetate monomer starting material, more preferably 15 to 50 mole %, and particularly preferably 22 to 45 mole %.

Furthermore, the polyvinyl acetal may have a vinyl acetate unit as another component, and the content thereof is preferably 0.01 to 20 mole %, and more preferably 0.1 to 10 mole %. The polyvinyl acetal may further have another copolymerization unit.

Examples of the polyvinyl acetal include polyvinyl butyral, polyvinyl propylal, polyvinyl ethylal, and polyvinyl methylal. Among them, polyvinyl butyral is a PVA derivative that is particularly preferably used.

As an aldehyde used for an acetal treatment, acetaldehyde or butyraldehyde is preferably used because of ease of handling.

As the polyvinyl butyral, the Denka Butyral series manufactured by Denki Kagaku Kogyo Kabushiki Kaisha may preferably be used.

From the viewpoint of availability as a commercial product and alcohol solubility (particularly in ethanol), the polyvinyl butyral is preferably the ‘S-LEC B’ series and the ‘S-LEC K(KS)’ series manufactured by Sekisui Chemical Co., Ltd. From the viewpoint of alcohol solubility (particularly in ethanol), the ‘S-LEC B’ series manufactured by Sekisui Chemical Co., Ltd. and ‘Denka Butyral’ manufactured by Denki Kagaku Kogyo Kabushiki Kaisha are more preferable; among the ‘S-LEC B’ series, ‘BL-1’, ‘BL-1H’, ‘BL-2’, ‘BL-5’, ‘BL-S’, ‘BX-L’, ‘BM-S’, and ‘BH-S’ are particularly preferable, and among the ‘Denka Butyral’ manufactured by Denki Kagaku Kogyo Kabushiki Kaisha ‘#3000-1’, ‘#3000-2’, ‘#3000-4’, ‘#4000-2’, ‘#6000-C’, ‘#6000-EP’, ‘#6000-CS’, and ‘#6000-AS’ are particularly preferable.

Furthermore, as the crosslinking polymer having a hydroxy group in a side chain, a novolac resin may be used, this being a resin formed by condensation of a phenol and an aldehyde under acidic conditions.

Preferred examples of the novolac resin include a novolac resin obtained from phenol and formaldehyde, a novolac resin obtained from m-cresol and formaldehyde, a novolac resin obtained from p-cresol and formaldehyde, a novolac resin obtained from o-cresol and formaldehyde, a novolac resin obtained from octylphenol and formaldehyde, a novolac resin obtained from mixed m-/p-cresol and formaldehyde, and a novolac resin between a mixture of phenol/cresol (any of m-, p-, o- or m-/p-, m-/o-, o-/p-mixtures) and formaldehyde.

With regard to these novolac resins, those having a weight-average molecular weight of 800 to 200,000 and a number-average molecular weight of 400 to 60,000 are preferable.

The content of the hydroxy group contained in the crosslinking polymer used in the present invention is preferably 0.1 to 15 mmol/g, and more preferably 0.5 to 7 mmol/g.

Among the crosslinking polymers, a polymer having —NHR in a polymer side chain is now explained. As the polymer compound having —NHR in a polymer side chain, an acrylic resin is preferable. For example, a polymer having acrylamide as a polymerization component, a polymer in which a carboxy group of an acrylic acid copolymer is aminoalkylated, etc. are preferable. Such polymers are commercially available, and examples thereof include the Polyment (registered trademark) series manufactured by Nippon Shokubai Co., Ltd.

In the present invention, for a polymer in any of the above-mentioned embodiments the —NHR group content in the crosslinking polymer is preferably 0.1 to 15 mmol/g, and more preferably 0.5 to 7 mmol/g.

In the present invention, a silyl group as a crosslinkable group in Component A to Component C reacts with a hydroxy group and/or —NHR group as a crosslinking group in the crosslinking polymer. As a result, the crosslinking polymer molecules themselves are three-dimensionally crosslinked by polyfunctional Component A to Component C. Because of this, the crosslinked relief (-forming) layer that is obtained has excellent film elasticity, ink transfer properties, and printing durability.

Furthermore, a bond contributing to the three-dimensional crosslinked structure due to a reaction between a crosslinkable group in Component A to Component C and a hydroxy group or —NHR group in the crosslinking polymer has a relatively weak bonding force and is easily cleaved by laser engraving, and engraving sensitivity therefore becomes high.

Polymer that can be Used on its Own or in Combination with Crosslinking Polymer

A polymer that can be used on its own or in combination with the crosslinking polymer is now explained.

For example, from the viewpoint of laser engraving sensitivity, said polymer is preferably a polymer containing a partial structure that thermally decomposes upon exposure to light or heating. Preferred examples of such a polymer include those described in paragraph 0038 of JP-A-2008-163081 (JP-A denotes a Japanese unexamined patent application publication). For the purpose of forming a soft film having flexibility, a soft resin or a thermoplastic elastomer is selected. They are described in detail in paragraphs 0039 and 0040 of JP-A-2008-163081. Furthermore, when the resin composition for laser engraving is applied to a relief-forming layer, from the viewpoint of ease of preparation of a resin composition for laser engraving and improvement of resistance to oil-based ink of a relief printing plate that is obtained, a hydrophilic or alcoholphilic polymer is preferably used. As a hydrophilic polymer, those described in detail in paragraph 0041 of JP-A-2008-163081 may be used.

Similarly, as the polymer that can be used on its own or in combination with the crosslinking polymer, when it is used for the purpose of curing by heat or light exposure and improving strength, a polymer having a carbon-carbon unsaturated bond in the molecule is preferably used.

As a polymer having a carbon-carbon unsaturated bond in the main chain, SI (polystyrene-polyisoprene), SB (polystyrene-polybutadiene), SBS (polystyrene-polybutadiene-polystyrene), SIS (polystyrene-polyisoprene-polystyrene), SEBS (polystyrene-polyethylene/polybutylene-polystyrene), etc. can be cited. Among them, SI is preferably used.

A polymer having a carbon-carbon unsaturated bond in a side chain may be obtained by introducing, into a side chain of the skeleton of the above-mentioned polymer, a carbon-carbon unsaturated bond such as an allyl group, an acryloyl group, a methacryloyl group, a styryl group, or a vinyl ether group. As a method for introducing a carbon-carbon unsaturated bond into a polymer side chain, a known method such as (1) a method in which a polymer is copolymerized with a structural unit having a polymerizable group precursor formed by bonding a protecting group to a polymerizable group, and the protecting group is removed to give a polymerizable group or (2) a method in which a polymer compound having a plurality of reactive groups such as hydroxy groups, amino groups, epoxy groups, or carboxy groups is prepared and a polymer reaction is carried out with a compound having a carbon-carbon unsaturated bond and a group that reacts with these reactive groups may be employed. In accordance with these methods, the amount of unsaturated bond and polymerizable group introduced into the polymer compound can be controlled.

The weight-average molecular weight (on a polystyrene basis by GPC measurement) of the binder polymer is preferably 5,000 to 500,000, more preferably 10,000 to 400,000, and yet more preferably 15,000 to 300,000. When the weight-average molecular weight is at least 5,000, the shape retention as a single resin is excellent, and when it is no greater than 500,000, it is easily dissolved in a solvent such as water and it is convenient for preparation of the resin composition for laser engraving.

In this way, according to the intended purpose, one or more types of binder polymers may be used singly or in combination while taking into consideration physical properties that meet the intended application of the resin composition for laser engraving.

From the viewpoint of printing durability of a relief printing plate and flexibility of a relief layer, the content of the binder polymer is preferably 15 to 50 wt % relative to the total weight of the solids content of the resin composition for laser engraving, more preferably 20 to 40 wt %, and yet more preferably 25 to 35 wt %.

(Component E) Chain-Polymerizable Monomer

The resin composition for laser engraving of the present invention preferably comprises (Component E) a chain-polymerizable monomer. The chain-polymerizable monomer is preferably a radically polymerizable monomer that undergoes addition polymerization by a radical polymerization initiating species, is more preferably a compound having one or more radical addition-polymerizable ethylenically unsaturated group, and is particularly preferably a polyfunctional ethylenically unsaturated compound having two or more radical addition-polymerizable ethylenically unsaturated groups. This radically polymerizable monomer is preferably a polyfunctional ethylenically unsaturated compound having at least one ethylenically unsaturated group at a molecular terminal, and more preferably two or more thereof.

The radically polymerizable monomer may be of any chemical configuration such as a monomer, a prepolymer, that is, a dimer, a trimer, or an oligomer, a copolymer thereof, or a mixture thereof.

Examples of the polymerizable monomer include an unsaturated carboxylic acid (e.g. acrylic acid, methacrylic acid, itaconic acid, crotonic acid, isocrotonic acid, maleic acid, etc.), an ester thereof, and an amide. It is preferable to use an ester of an unsaturated carboxylic acid and an aliphatic polyhydric alcohol compound or an amide of an unsaturated carboxylic acid and an aliphatic polyvalent amine compound.

Furthermore, it is also desirable to use an addition reaction product of an unsaturated carboxylic acid ester or amide having a nucleophilic substituent such as a hydroxy group, an amino group or a mercapto group with a monofunctional or polyfunctional isocyanate or epoxy, or a dehydration-condensation reaction product of the carboxylic acid ester or amide with a monofunctional or polyfunctional carboxylic acid.

It is also desirable to use an addition reaction product of an unsaturated carboxylic acid ester or amide having an electrophilic substituent such as an isocyanato group or an epoxy group with a monofunctional or polyfunctional alcohol, an amine or a thiol, or a substitution reaction product of an unsaturated carboxylic acid ester or amide having a leaving group such as a halogen atom or a tosyloxy group with a monofunctional or polyfunctional alcohol, amine or thiol. As another example, it is possible to use a group of compounds in which the above-mentioned unsaturated carboxylic acid (ester) is replaced by an unsaturated phosphonic acid, styrene, vinyl ether, etc.

A polyfunctional ethylenically unsaturated compound is explained below. The polyfunctional ethylenically unsaturated compound includes an ester of an aliphatic polyhydric alcohol compound and an unsaturated carboxylic acid. Specific examples include, as an ester of (meth)acrylic acid, ethylene glycol di(meth)acrylate, triethylene glycol di(meth) acrylate, 1,3-butanediol di(meth)acrylate, tetramethylene glycol di(meth)acrylate, propylene glycol di(meth)acrylate, neopentyl glycol di(meth)acrylate, trimethylolpropane tri (meth)acrylate, trimethylolpropane tri((meth)acryloyloxypropyl)ether, trimethylolethane tri(meth)acrylate, hexanediol di(meth)acrylate, 1,4-cyclohexanediol di(meth) acrylate, tetraethylene glycol di(meth)acrylate, pentaerythritol di(meth)acrylate, pentaerythritol tri(meth) acrylate, pentaerythritol tetra(meth)acrylate, dipentaerythritol di(meth)acrylate, dipentaerythritol hexa(meth)acrylate, sorbitol tri(meth)acrylate, sorbitol tetra(meth)acrylate, sorbitol penta(meth)acrylate, sorbitol hexa(meth)acrylate, tri ((meth)acryloyloxyethyl) isocyanurate, a polyester (meth) acrylate oligomer, bis-[p-(3-(meth)acryloxy-2-hydroxypropoxy)phenyl]dimethylmethane, and bis-[p-((meth)acryloxyetoxy)phenyl]dimethylmethane etc. Among them, dipentaerythritol hexa(meth)acrylate, pentaerythritol tetra(meth)acrylate and trimethylolpropane tri(meth)acrylate are preferable.

Furthermore, as the polyfunctional ethylenically unsaturated compound, a saturated bridged cyclic polyfunctional monomer having a fused ring structure such as a compound having a bicyclo ring or tricyclo ring structure having two (meth)acryloyloxy groups may be used.

Examples of the bicyclo ring and tricyclo ring structures include an alicyclic hydrocarbon structure of a fused ring structure such as a norbornene skeleton (bicyclo[2.2.1]heptane), a dicyclopentadiene skeleton (tricyclo[5.2.1.$0^{2,6}$]decane), or an adamantane skeleton (tricyclo[3.3.1.$1^{3,7}$]decane).

With regard to the saturated bridged cyclic polyfunctional monomer, an amino group may be bonded to a bicyclo ring or tricyclo ring moiety directly or via an aliphatic moiety, for example an alkylene such as methylene or ethylene. Furthermore, a hydrogen atom of an alicyclic hydrocarbon group of these fused ring structures may be replaced by an alkyl group, etc.

In the present invention, the saturated bridged cyclic polyfunctional monomer is preferably an alicyclic polyfunctional monomer selected from those below. R denotes a hydrogen atom or a methyl group.

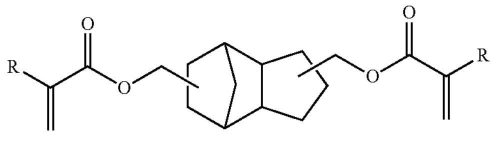

-continued

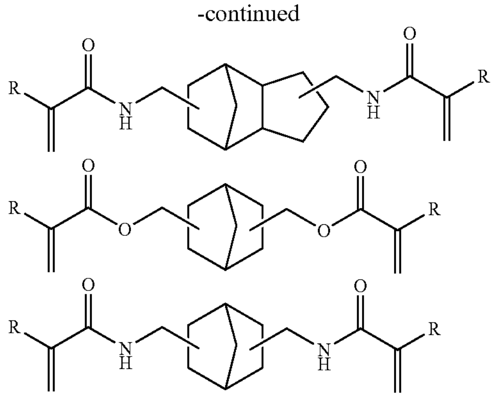

Examples of the itaconic acid ester include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of the crotonic acid ester include ethylene glycol dicrotonate, tetramethylene glycol dicrotonate, pentaerythritol dicrotonate, and sorbitol tetracrotonate.

Examples of the isocrotonic acid ester include ethylene glycol diisocrotonate, pentaerythritol diisocrotonate, and sorbitol tetraisocrotonate.

Examples of the maleic acid ester include ethylene glycol dimalate, triethylene glycol dimalate, pentaerythritol dimalate, and sorbitol tetramalate.

As examples of other esters, for example, aliphatic alcohol-based esters described in JP-B-46-27926 (JP-B denotes a Japanese examined patent application publication), JP-B-51-47334, and JP-A-57-196231, those having an aromatic skeleton described in JP-A-59-5240, JP-A-59-5241, and JP-A-2-226149, and those containing an amino group described in JP-A-1-165613 may suitably be used.

The above-mentioned ester-based polyfunctional ethylenically unsaturated compounds may be used on their own or as a mixture of two or more types thereof.

Specific examples of an amide monomer from an aliphatic polyvalent amine compound and an unsaturated carboxylic acid include methylene bis(meth)acrylamide, 1,6-hexamethylene bis(meth)acrylamide, diethylenetriamine tris(meth) acrylamide, and xylylene bis(meth)acrylamide.

Examples of other preferred amide-based polyfunctional ethylenically unsaturated compounds include those having a cyclohexylene structure described in JP-B-54-21726.

Furthermore, as a polyfunctional ethylenically unsaturated compound, a urethane-based addition-polymerizable polyfunctional monomer produced by an addition reaction of an isocyanate and a hydroxy group is also suitable. Specific examples thereof include a urethane-based polyfunctional ethylenically unsaturated compound containing two or more ethylenically unsaturated groups per molecule in which a polyisocyanate compound having two or more isocyanate groups per molecule described in JP-B-48-41708 is added to a hydroxy group-containing ethylenically unsaturated compound represented by Formula (A) below.

$$CH_2{=}C(R)COOCH_2CH(R')OH \qquad (A)$$

(R and R' independently denote H or $CH_3$.)

Furthermore, urethane acrylates described in JP-A-51-37193, JP-B-2-32293, and JP-B-2-16765, and urethane-based polyfunctional ethylenically unsaturated compounds having an ethylene oxide-based skeleton described in JP-B-58-49860, JP-B-56-17654, JP-B-62-39417, JP-B-62-39418 are also suitable.

Furthermore, by use of a polyfunctional ethylenically unsaturated compound having an amino structure or a sulfide structure in the molecule described in JP-A-63-277653, JP-A-63-260909, and JP-A-1-105238, a resin composition for laser engraving which is crosslinkable in a short time can be obtained.

Other examples of the polyfunctional ethylenically unsaturated compound include polyester acrylates such as those described in JP-A-48-64183, JP-B-49-43191, and JP-B-52-30490, and polyfunctional acrylates and methacrylates such as epoxy acrylates etc. formed by a reaction of an epoxy resin and (meth)acrylic acid. Examples also include specific unsaturated compounds described in JP-B-46-43946, JP-B-1-40337, and JP-B-1-40336, and vinylphosphonic acid-based compounds described in JP-A-2-25493. In some cases, perfluoroalkyl group-containing structures described in JP-A-61-22048 are suitably used. Moreover, those described as photocuring monomers or oligomers in the Journal of the Adhesion Society of Japan, Vol. 20, No. 7, pp. 300 to 308 (1984) may also be used.

The chain-polymerizable monomer is preferably a di- or higher-functional polyfunctional ethylenically unsaturated compound, and more preferably a tri- or higher-functional polyfunctional ethylenically unsaturated compound.

From the viewpoint of flexibility of a crosslinked film, the upper limit for the number of functional groups is preferably no greater than 10, more preferably no greater than 6, and yet more preferably no greater than 4.

From the viewpoint of flexibility, the content of chain-polymerizable monomer is preferably 5 to 40 wt % relative to the total weight of the solids content of the resin composition for laser engraving, more preferably 10 to 30 wt %, and yet more preferably 10 to 25 wt %.

(Component F) Polymerization Initiator

The resin composition for laser engraving of the present invention preferably comprises a radically polymerizable monomer as (Component E) a chain-polymerizable monomer and (Component F) a polymerization initiator.

As the polymerization initiator, a radical polymerization initiator is preferable, and compounds described in paragraphs 0074 to 0118 of JP-A-2008-63554 are preferable.

Examples of the radical polymerization initiator include an aromatic ketone, an onium salt compound, an organic peroxide, a thio compound, a hexaarylbiimidazole compound, a ketoxime ester compound, a borate compound, an azinium compound, a metallocene compound, an active ester compound, a compound having a carbon halogen bond, and an azo-based compound. Among them, from the viewpoint of engraving sensitivity and good relief edge shape of a crosslinked relief-forming layer, an organic peroxide and an azo-based compound are preferable, and an organic peroxide is particularly preferable.

Since an engraving sensitivity is greatly increased, use of an organic peroxide and a photothermal conversion agent, which is described later, in combination is preferable, and it is more preferable to employ a mode in which an organic peroxide and carbon black, which is a photothermal conversion agent, are used in combination.

When a relief-forming layer is cured by thermal crosslinking using an organic peroxide, unreacted organic peroxide that is not involved in radical formation may remain. The remaining organic peroxide functions as a self-reactive additive and decomposes exothermically during laser engraving. It is surmised that, as a result, an amount corresponding to the heat generated is added to the irradiated laser energy, and the engraving sensitivity is thus increased.

This effect is outstanding when carbon black is used as a photothermal conversion agent. It is surmised that, as a result of heat generated from carbon black being transmitted to an organic peroxide, heat is generated not only from the carbon black but also from the organic peroxide, and thermal energy that is used for decomposition of binder polymers, etc. is generated synergistically.

It is preferable for an organic peroxide to have a 10-hour half-life temperature of at least 60° C., more preferably at least 80° C., and particularly preferably at least 100° C. Furthermore, it is preferable for it to have a 10-hour half-life temperature of no greater than 220° C., more preferably no greater than 200° C., and particularly preferably no greater than 180° C.

It is preferable for the 10-hour half-life temperature to be in the above-mentioned range since the resin composition obtains sufficient crosslink density.

The 10-hour half-life temperature is measured as follows.

A 0.1 mol/L concentration solution of a peroxide is prepared using benzene as a solvent, and sealed in a nitrogen-flushed glass tube. This is immersed in a thermostatted bath set at a predetermined temperature, thus carrying out thermal decomposition. Since, in general, decomposition of an organic peroxide in dilute solution can be treated as an approximately first order reaction, when the amount of peroxide decomposed is x (mol/L), the decomposition rate constant is k (1/h), the time is t (h), and the initial peroxide concentration is a (mol/L), Formula (1) and Formula (2) below hold.

$$dx/dt=k(a-x) \quad (1)$$

$$\ln\{a/(a-x)\}=kt \quad (2)$$

Since the half-life is the time taken for the peroxide concentration to decrease to half of the initial value by decomposition, if the half-life is denoted by $t_{1/2}$ and x of Formula (2) is substituted by a/2, this gives Formula (3) below.

$$kt_{1/2}=\ln 2 \quad (3)$$

Therefore, the half-life ($t_{1/2}$) at a given temperature can be determined from Formula (3) by carrying out thermal decomposition at the given temperature, plotting the relationship between time (t) and ln {a/(a−x)}, and determining k from the slope of the straight line thus obtained.

With regard to the decomposition rate constant k, when the frequency factor is A (1/h), the activation energy is E (J/mol), the gas constant is R (8.314 J/mol·K), and the absolute temperature is T (K), Formula (4) below holds.

$$\ln k=\ln A-\Delta E/RT \quad (4)$$

Eliminating k from Formula (3) and Formula (4) gives $$\ln(t_{1/2})=\Delta E/RT-\ln(A/2) \quad (5),$$

$t_{1/2}$ is calculated for several temperature points, the relationship between $\ln(t_{1/2})$ and 1/T is plotted, and the temperature at $t_{1/2}$=10 h is determined from the straight line thus obtained.

The organic peroxide is preferably a dialkyl peroxide, a peroxyketal, a peroxyester, a diacyl peroxide, an alkyl hydroperoxide, a peroxydicarbonate, or a ketone peroxide, and more preferably an organic peroxide selected from the group consisting of a dialkyl peroxide, a peroxyketal, and a peroxyester.

Examples of the dialkyl peroxide include di-t-butyl peroxide, di-t-hexyl peroxide, t-butylcumyl peroxide, dicumyl peroxide, α,α'-bis(t-butylperoxy)diisopropylbenzene, 2,5-dimethyl-2,5-bis(t-butylperoxy)hexane, and 2,5-dimethyl-2,5-bis(t-butylperoxy)hexyne-3.

Examples of the peroxyketal include n-butyl 4,4-bis(t-butylperoxy)valerate, 2,2-bis(t-butylperoxy)butane, 1,1-bis(t-butylperoxy)cyclohexane, 1,1-bis(t-hexylperoxy)cyclohexane, 1,1-bis(t-butylperoxy)-3,3,5-trimethylcyclohexane, and 1,1-bis(t-hexylperoxy)-3,3,5-trimethylcyclohexane.

Examples of the peroxyester include α-cumyl peroxyneodecanoate, 1,1-dimethyl-3-hydroxybutyl peroxy-2-ethylhexanoate, t-amyl peroxybenzoate, t-butyl peroxybenzoate, and t-butyl peroxypivalate.

Furthermore, as the organic peroxide, a diacyl peroxide such as dibenzoyl peroxide, succinic acid peroxide, dilauroyl peroxide, or didecanoyl peroxide, an alkyl hydroperoxide such as 2,5-dihydroperoxy-2,5-dimethylhexane, cumene hydroperoxide, or t-butyl hydroperoxide, or a peroxydicarbonate such as di(n-propyl) peroxydicarbonate, di(sec-butyl) peroxydicarbonate, or di(2-ethylhexyl) peroxydicarbonate may also be used.

Organic peroxides are commercially available from, for example, NOF Corporation, Kayaku Akzo Corporation, etc.

With regard to the polymerization initiator in the present invention, one type may be used on its own or two or more types may be used in combination.

The content of the polymerization initiator in the resin composition for laser engraving is preferably 0.01 to 10 wt % relative to the total weight of the solids content of the resin composition for laser engraving, and more preferably 0.1 to 3 wt %. When the content of the polymerization initiator is at least 0.01 wt %, an effect from the addition thereof is obtained, and crosslinking of a crosslinked relief-forming layer proceeds promptly. Furthermore, when the content is no greater than 10 wt %, other components do not become insufficient, and printing durability that is satisfactory as a relief printing plate is obtained.

(Component G) Plasticizer

The resin composition for laser engraving of the present invention preferably comprises a plasticizer. The plasticizer is preferably an ester compound having a boiling point of 200° C. to 450° C.

In order to maintain soft film physical properties while having a network due to chain polymerization of the polyfunctional monomer and crosslinking of the polymer, the plasticizer is preferably 10 to 50 wt % of the total solids content weight of the resin composition for laser engraving, more preferably 10 to 40 wt %, and particularly preferably 10 to 30 wt %. The plasticizer is preferably a carboxylic acid ester, a phosphoric acid ester, or a sulfonic acid ester, more preferably a carboxylic acid ester or a phosphoric acid ester, and yet more preferably a carboxylic acid ester. Among the carboxylic acid esters, a citric acid derivative is preferable, and tributyl citrate and tri-n-butyl acetyl citrate are more preferable.

The plasticizer is preferably present stably in a film during thermal crosslinking and easily evaporated during laser engraving, and preferably has an appropriate boiling point. The boiling point of the plasticizer is preferably 200° C. to 450° C., more preferably 250° C. to 400° C., and particularly preferably 300° C. to 350° C.

The ratio by weight (plasticizer/binder polymer) of the plasticizer to the binder polymer content is preferably 0.6 to 1.6, more preferably 0.8 to 1.4, and yet more preferably 1.0 to 1.2 since flexibility as a flexographic printing plate is appropriate.

(Component H) Photothermal Conversion Agent

The resin composition for laser engraving of the present invention preferably comprises a photothermal conversion agent.

It is surmised that the photothermal conversion agent absorbs laser light and generates heat thus promoting thermal decomposition of a cured material of the resin composition for laser engraving of the present invention. Because of this, it is preferable to select a photothermal conversion agent that absorbs light having the wavelength of the laser that is used for engraving.

When a laser (a YAG laser, a semiconductor laser, a fiber laser, a surface emitting laser, etc.) emitting infrared at a wavelength of 700 nm to 1,300 nm is used as a light source for laser engraving of the printing plate precursor produced by using the resin composition of the present invention, it is preferable to use a compound having a maximum absorption wavelength at 700 nm to 1,300 nm as a photothermal conversion agent.

As the photothermal conversion agent in the present invention, various types of dye or pigment are used.

With regard to the photothermal conversion agent, examples of dyes that can be used include commercial dyes and known dyes described in publications such as 'Senryo Binran' (Dye Handbook) (Ed. by The Society of Synthetic Organic Chemistry, Japan, 1970). Specific examples include dyes having a maximum absorption wavelength at 700 nm to 1,300 nm, such as azo dyes, metal complex salt azo dyes, pyrazolone azo dyes, naphthoquinone dyes, anthraquinone dyes, phthalocyanine dyes, carbonium dyes, diimmonium compounds, quinone imine dyes, methine dyes, cyanine dyes, squarylium colorants, pyrylium salts, and metal thiolate complexes. In particular, cyanine-based colorants such as heptamethine cyanine colorants, oxonol-based colorants such as pentamethine oxonol colorants, and phthalocyanine-based colorants are preferably used. Examples include dyes described in paragraphs 0124 to 0137 of JP-A-2008-63554.

With regard to the photothermal conversion agent used in the present invention, examples of pigments include commercial pigments and pigments described in the Color Index (C.I.) Handbook, 'Saishin Ganryo Binran' (Latest Pigments Handbook) (Ed. by Nippon Ganryo Gijutsu Kyokai, 1977), 'Saisin Ganryo Ouyogijutsu' (Latest Applications of Pigment Technology) (CMC Publishing, 1986), 'Insatsu Inki Gijutsu' (Printing Ink Technology) (CMC Publishing, 1984). Examples include pigments described in paragraphs 0122 to 0125 of JP-A-2009-178869. Among these pigments, carbon black is preferable.

Any carbon black, regardless of classification by ASTM (American Society for Testing and Materials) and application (e.g. for coloring, for rubber, for dry cell, etc.), may be used as long as dispersibility, etc. in the resin composition for laser engraving is stable. Carbon black includes for example furnace black, thermal black, channel black, lamp black, and acetylene black. In order to make dispersion easy, a black colorant such as carbon black may be used as color chips or a color paste by dispersing it in nitrocellulose or a binder in advance using, as necessary, a dispersant, and such chips and paste are readily available as commercial products. Examples include carbon black described in paragraphs 0130 to 0134 of JP-A-2009-178869.

When the crosslinked relief-forming layer comprises the photothermal conversion agent, preferably carbon black, the content of the photothermal conversion agent largely depends on the size of the molecular extinction coefficient characteristic to the molecule, and is preferably 0.01 to 30 wt % relative to the total weight of the solids content of the resin composition for laser engraving, more preferably 1 to 20 wt %, and yet more preferably 5 to 15 wt %.

(Component I) Crosslinking Catalyst

The resin composition for laser engraving preferably comprises (Component I) a crosslinking catalyst (an alcohol exchange reaction catalyst) in order to promote formation of a crosslinked structure from Component A to Component C. The alcohol exchange reaction catalyst may be used without any restrictions as long as it is a reaction catalyst generally used in a silane coupling reaction. Hereinafter, (Component I1) an acidic or basic catalyst and (Component I2) a metal complex catalyst, which are representative alcohol exchange reaction catalysts, are explained in sequence.

(Component I1) Acidic or Basic Catalyst

As the catalyst, an acidic or basic compound is used as it is or in the form of a solution in which it is dissolved in a solvent such as water or an organic solvent (hereinafter, also called an acidic catalyst or basic catalyst respectively). The concentration when dissolved in a solvent is not particularly limited, and it may be selected appropriately according to the properties of the acidic or basic compound used, and desired catalyst content, etc.

Examples of the acidic catalyst include a hydrogen halide such as hydrochloric acid, nitric acid, sulfuric acid, sulfurous acid, hydrogen sulfide, perchloric acid, hydrogen peroxide, carbonic acid, a carboxylic acid such as formic acid or acetic acid, a carboxylic acid in which R of the structural formula RCOOH is substituted with another element or substituent, a sulfonic acid such as benzenesulfonic acid, phosphoric acid, a heteropoly acid, and an inorganic solid acid.

Examples of the basic catalyst include an ammoniacal base such as aqueous ammonia, an amine, an alkali metal hydroxide, an alkali metal alkoxide, an alkaline earth oxide, a quaternary ammonium salt compound, and a quaternary phosphonium salt compound.

Examples of the amine include (a) a hydrogenated nitrogen compound such as hydrazine; (b) an aliphatic amine, alicyclic amine or aromatic amine; (c) a condensed ring-containing cyclic amine; (d) an oxygen-containing amine such as an amino acid, an amide, an alcoholamine, an ether amine, an imide or a lactam; and (e) a heteroelement-containing amine having a heteroatom such as S or Se.

As the aliphatic amine (b), an amine compound represented by Formula (Y-1) is preferable.

$$N(R^{d1})(R^{d2})(R^{d3}) \quad \text{(Y-1)}$$

In Formula (Y-1), $R^{d1}$ to $R^{d3}$ independently denote a hydrogen atom, a straight-chain or branched alkyl group having 1 to 10 carbons, a cycloalkyl group having 5 to 10 carbons, an aryl group having 6 to 20 carbons, or a 3- to 10-membered sulfur atom- or oxygen atom-containing heterocycle (preferably a thiophene), and the alkyl group and cycloalkyl group may have at least one unsaturated bond.

The amine compound represented by Formula (Y-1) may have a substituent, and examples of the substituent include an alkyl group having 1 to 10 carbons, an aryl group having 6 to 20 carbons, an amino group, a (di)alkylamino group having an alkyl group having 1 to 6 carbons, and a hydroxy group.

Two or more groups among $R^{d1}$ to $R^{d3}$ above may be bonded to form a C=N bond. Examples of an amine compound having a C=N bond include guanidine and 1,1,3,3-tetramethylguanidine.

Examples of the alicyclic amine (b) include an alicyclic amine in which a ring skeleton, where two or more groups among $R^{d1}$ to $R^{d3}$ in a compound represented by Formula (Y-1) above are bonded, contains a nitrogen atom. Examples of the alicyclic amine include pyrrolidine, piperidine, piperazine, and quinuclidine.

Examples of the aromatic amine (b) include imidazole, pyrrole, pyridine, pyridazine, pyrazine, purine, quinoline, and quinazoline. The aromatic amine may have a substituent, and examples of the substituent include substituents described for Formula (Y-1).

Furthermore, two or more identical or different aliphatic amines, alicyclic amines, or aromatic amines may be bonded to form a polyamine such as a diamine or a triamine. The polyamine is preferably a polyamine in which aliphatic amines are bonded, and examples thereof include hexamethylenetetramine and polyethyleneimine (Epomin, Nippon Shokubai Co., Ltd.). In the present invention, component I is preferably a polyamine, and more preferably a polyethyleneimine.

The cyclic amine (c) containing a condensed ring is a cyclic amine in which at least one nitrogen atom is contained in a ring skeleton forming a condensed ring; examples thereof include 1,8-diazabicyclo[5.4.0]undec-7-ene, 1,5-diazabicyclo[4.3.0]non-5-ene, and 1,4-diazabicyclo[2.2.2]octane, and 1,8-diazabicyclo[5.4.0]undec-7-ene is preferable.

Examples of the oxygen-containing amine (d) such as an amino acid, an amide, an alcoholamine, an ether amine, an imide, or a lactam include phthalimide, 2,5-piperazinedione, maleimide, caprolactam, pyrrolidone, morpholine, glycine, alanine, and phenylalanine.

In addition, (c) and (d) may have the substituent described for a compound represented by Formula (Y-1), and among them an alkyl group having 1 to 6 carbons is preferable.

As the amine compound in the present invention, (b) and (c) are preferable. As (b), an aliphatic amine is preferable, a polyamine of an aliphatic amine is more preferable, and polyethyleneimine is particularly preferable. As (c), 1,8-diazabicyclo[5.4.0]undec-7-ene is preferable.

Among the above-mentioned acidic or basic catalysts, from the viewpoint of an alcohol exchange reaction progressing quickly in the film, methanesulfonic acid, p-toluenesulfonic acid, pyridinium p-toluenesulfonate, dodecylbenzenesulfonic acid, phosphoric acid, phosphonic acid, acetic acid, polyethyleneimine, 1,8-diazabicyclo[5.4.0]undec-7-ene, 1,5-diazabicyclo[4.3.0]non-5-ene, and 1,1,3,3-tetramethylguanidine are preferable, and phosphoric acid, polyethyleneimine, and 1,8-diazabicyclo[5.4.0]undec-7-ene (DBU) are particularly preferable.

From the viewpoint of film strength after thermal crosslinking, the resin composition for laser engraving of the present invention preferably comprises a compound having an acid dissociation constant (pKa) for a conjugate acid of 7 or greater, and more preferably 11 to 13.

The resin composition for laser engraving of the present invention may employ only one type or two or more types in combination of a compound having an acid dissociation constant (pKa) for a conjugate acid of 11 to 13.

The content of the basic catalyst in the resin composition for laser engraving is preferably 0.01 to 20 wt % in the total solids content of the resin composition for laser engraving, more preferably 0.1 to 10 wt %, and particularly preferably 0.5 to 5 wt %.

(Component I2) Metal Complex Catalyst

The metal complex catalyst that can be used as an alcohol exchange reaction catalyst in the present invention is preferably constituted from a metal element selected from Groups 2, 4, 5, and 13 of the periodic table and an oxo or hydroxy oxygen compound selected from β-diketones, ketoesters, hydroxycarboxylic acids and esters thereof, amino alcohols, and enolic active hydrogen compounds.

Furthermore, among the constituent metal elements, a Group 2 element such as Mg, Ca, Sr, or Ba, a Group 13 element such as Al or Ga, a Group 4 element such as Ti or Zr, and a Group 5 element such as V, Nb, or Ta are preferable, and they form a complex having an excellent catalytic effect. Among them, a complex obtained from Zr, Al, or Ti (ethyl orthotitanate, etc.) is excellent and preferable.

In the present invention, examples of the oxo or hydroxy oxygen-containing compound constituting a ligand of the above-mentioned metal complex include β-diketones such as acetylacetone (2,4-pentanedione) and 2,4-heptanedione, ketoesters such as methyl acetoacetate, ethyl acetoacetate, and butyl acetoacetate, hydroxycarboxylic acids and esters thereof such as lactic acid, methyl lactate, salicylic acid, ethyl salicylate, phenyl salicylate, malic acid, tartaric acid, and methyl tartarate, ketoalcohols such as 4-hydroxy-4-methyl-2-pentanone, 4-hydroxy-2-pentanone, 4-hydroxy-4-methyl-2-pentanone, and 4-hydroxy-2-heptanone, amino alcohols such as monoethanolamine, N,N-dimethylethanolamine, N-methylmonoethanolamine, diethanolamine, and triethanolamine, enolic active compounds such as methylolmelamine, methylolurea, methylolacrylamide, and diethyl malonate ester, and compounds having a substituent on the methyl group, methylene group, or carbonyl carbon of acetylacetone (2,4-pentanedione).

A preferred ligand is an acetylacetone derivative, and the acetylacetone derivative in the present invention means a compound having a substituent on the methyl group, methylene group, or carbonyl carbon of acetylacetone. The substituent with which the methyl group of acetylacetone is substituted is a straight-chain or branched alkyl group, acyl group, hydroxyalkyl group, carboxyalkyl group, alkoxy group, or alkoxyalkyl group that all have 1 to 3 carbons, the substituent with which the methylene carbon of acetylacetone is substituted is a carboxy group or a straight-chain or branched carboxyalkyl group or hydroxyalkyl group having 1 to 3 carbons, and the substituent with which the carbonyl carbon of acetylacetone is substituted is an alkyl group having 1 to 3 carbons, and in this case the carbonyl oxygen turns into a hydroxy group by addition of a hydrogen atom.

Specific preferred examples of the acetylacetone derivative include acetylacetone, ethylcarbonylacetone, n-propylcarbonylacetone, i-propylcarbonylacetone, diacetylacetone, 1-acetyl-1-propionylacetylacetone, hydroxyethylcarbonylacetone, hydroxypropylcarbonylacetone, acetoacetic acid, acetopropionic acid, diacetoacetic acid, 3,3-diacetopropionic acid, 4,4-diacetobutyric acid, carboxyethylcarbonylacetone, carboxypropylcarbonylacetone, and diacetone alcohol, and among them acetylacetone and diacetylacetone are preferable. The complex of the acetylacetone derivative and the metal element is a mononuclear complex in which 1 to 4 molecules of acetylacetone derivative coordinate to one metal element, and when the number of coordinatable sites of the metal element is larger than the total number of coordinatable bond sites of the acetylacetone derivative, a ligand that is usually used in a normal complex, such as a water molecule, a halide ion, a nitro group, or an ammonio group may coordinate thereto.

Preferred examples of the metal complex include a tris(acetylacetonato)aluminum complex salt, a di(acetylacetonato)aluminum-aquo complex salt, a mono(acetylacetonato)aluminum-chloro complex salt, a di(diacetylacetonato)aluminum complex salt, ethyl acetoacetate aluminum diisopropylate, aluminum tris(ethyl acetoacetate), cyclic aluminum oxide isopropylate, a tris(acetylacetonato)barium complex salt, a di(acetylacetonato)titanium complex salt, a tris(acetylacetonato)titanium complex salt, a di-i-propoxy-bis(acetylacetonato)titanium complex salt, zirconium tris (ethyl acetoacetate), and a zirconium tris(benzoic acid) complex salt. They are excellent in terms of stability in an aqueous coating solution and an effect in promoting gelling in a sol-gel reaction when thermally drying, and among them ethyl acetoacetate aluminum diisopropylate, aluminum tris(ethyl acetoacetate), a di(acetylacetonato)titanium complex salt, and zirconium tris(ethyl acetoacetate) are particularly preferable.

In the present invention, one type of linking catalyst may be used on its own or two or more types thereof may be used in combination from Component I1 or Component I2. The content of linking catalyst is preferably 0.01 to 20 wt % relative to the total weight of the solids content of the resin composition for laser engraving, and more preferably 0.1 to 10 wt %.

Other Additives

The resin composition for a relief-forming layer that can be used in the present invention may comprise as appropriate various types of additives as long as the effects of the present invention are not inhibited. Examples include a filler, a wax, a process oil, an organic acid, a metal oxide, an antiozonant, an anti-aging agent, a thermopolymerization inhibitor, and a colorant, and one type thereof may be used on its own or two or more types may be used in combination.

Relief Printing Plate Precursor for Laser Engraving

The relief printing plate precursor for laser engraving of the present invention comprises a relief-forming layer formed from the resin composition for laser engraving of the present invention.

In the present invention, the 'relief-forming layer' means a layer in a state before being crosslinked. That is, it is preferably a layer formed from the resin composition for laser engraving, and preferable to be in a dry state in which solvent is removed.

In the present invention, the 'crosslinked relief-forming layer' means a layer in which the relief-forming layer is crosslinked by a chain polymerization or a sequential crosslinking reaction. The crosslinking is carried out by means of heat and/or light. Furthermore, the crosslinking is not particularly limited as long as it is a reaction by which the resin composition for laser engraving is cured.

The 'relief printing plate' is prepared by laser engraving a printing plate precursor having a crosslinked relief-forming layer.

Moreover, in the present invention, the 'relief layer' means a layer formed by engraving the crosslinked relief-forming layer of the relief printing plate precursor using a laser, that is, the crosslinked relief-forming layer after laser engraving.

Crosslinked Relief-Forming Layer

The crosslinked relief-forming layer is a layer formed by crosslinking the resin composition for laser engraving, and is preferably a layer in which self-condensation of alkoxysilane compounds of Component A to Component C, crosslinking between the alkoxysilane compound and a crosslinking polymer, and crosslinking of a chain-polymerizable monomer of Component E are carried out by the application of heat.

As an embodiment of production of a relief printing plate precursor, it is preferable to prepare a flexographic printing plate precursor having a crosslinked relief-forming layer that is crosslinked by chain polymerization and a sequential crosslinking reaction of the resin composition for laser engraving.

A relief printing plate having a relief layer is formed by laser-engraving the obtained flexographic printing plate precursor. It is possible to prevent wear of a relief layer during printing by crosslinking the relief-forming layer by two or more different crosslinking reactions. Furthermore, a relief printing plate having a relief layer with a sharp shape after laser engraving can be obtained.

The crosslinked relief-forming layer may be formed by molding the resin composition for laser engraving into a sheet shape or a sleeve shape. The crosslinked relief-forming layer is usually provided above a support, which is described later. And it may be formed directly on the surface of a member such as a cylinder of equipment for plate making or printing after peeling off from the support or may be placed and immobilized thereon, and it is not always required that the support keeps the same from production to use.

A case in which the relief-forming layer is mainly formed in a sheet shape is explained as an Example below.

A relief printing plate precursor for laser engraving of the present invention preferably comprises a crosslinked relief-forming layer formed by crosslinking the resin composition for laser engraving. The crosslinked relief-forming layer is preferably provided above a support.

The relief printing plate precursor for laser engraving may comprise an adhesive layer between the support and the crosslinked relief-forming layer, and, above the crosslinked relief-forming layer, a slip coat layer and a protection film.

Support

A material used for the support of the relief printing plate precursor for laser engraving is not particularly limited, but one having high dimensional stability is preferably used. Examples thereof include metals such as steel, stainless steel, or aluminum, plastic resins such as a polyester (e.g. polyethylene terephthalate (PET), polybutylene terephthalate (PBT), or polyacrylonitrile (PAN)) or polyvinyl chloride, synthetic rubbers such as styrene-butadiene rubber, and glass fiber-reinforced plastic resins (epoxy resin, phenolic resin, etc.). As the support, a PET film or a steel substrate is preferably used. The configuration of the support depends on whether the relief-forming layer is in a sheet shape or a sleeve shape.

Adhesive Layer

An adhesive layer may be provided between the crosslinked relief-forming layer and the support for the purpose of strengthening the adhesion between the two layers. Examples of materials (adhesives) that can be used in the adhesive layer include those described in 'Handbook of Adhesives', Second Edition, Ed by I. Skeist, (1977).

Protection Film, Slip Coat Layer

For the purpose of preventing scratches or dents in the relief-forming layer surface or the crosslinked relief-forming layer surface, a protection film may be provided on the relief-forming layer surface or the crosslinked relief-forming layer surface. The thickness of the protection film is preferably 25 to 500 μm, and more preferably 50 to 200 μm. The protection film may employ, for example, a polyester-based film such as PET or a polyolefin-based film such as PE (polyethylene) or PP (polypropylene). The surface of the film may be made matte. The protection film is preferably peelable.

When the protection film is not peelable or conversely has poor adhesion to the relief-forming layer, a slip coat layer may be provided between the two layers. The material used in the slip coat layer preferably employs as a main component a resin that is soluble or dispersible in water and has little tackiness, such as polyvinyl alcohol, polyvinyl acetate, partially saponified polyvinyl alcohol, a hydroxyalkylcellulose, an alkylcellulose, or a polyamide resin.

Process for Producing Relief Printing Plate Precursor for Laser Engraving

A process for producing a relief printing plate precursor for laser engraving of the present invention preferably comprises a layer formation step of forming a relief-forming layer from the resin composition for laser engraving of the present invention and a crosslinking step of crosslinking the relief-forming layer by means of heat and/or light to thus form a crosslinked relief-forming layer.

Layer Formation Step

The process for making a relief printing plate precursor for laser engraving of the present invention preferably comprises a layer formation step of forming a relief-forming layer from the resin composition for laser engraving of the present invention.

Preferred examples of a method for forming the relief-forming layer include a method in which the resin composition for the relief-forming layer is prepared, solvent is removed as necessary, and it is then melt-extruded onto a support and a method in which the resin composition for laser engraving is prepared, cast onto a support, and dried in an oven to thus remove solvent.

The resin composition for laser engraving may be produced by, for example, mixing and stirring (Component D) a binder polymer, (Component E) a chain-polymerizable monomer, (Component G) a plasticizer, (Component H) a photothermal conversion agent, (Component I) a linking catalyst, and solvent to dissolve or disperse each component, and then adding at least two types of alkoxysilane compounds of compound A to compound C and a polymerization initiator, and further stirring.

It is preferable to remove most of the solvent component in a stage of producing a relief printing plate precursor for laser engraving. It is preferable to use as the solvent a volatile low-molecular-weight alcohol (e.g. methanol, ethanol, n-propanol, isopropanol, propylene glycol monomethyl ether), etc., and adjust the temperature, etc. to thus reduce as much as possible the total amount of solvent to be added.

The thickness of the crosslinked relief-forming layer in the relief printing plate precursor for laser engraving before and after crosslinking is preferably at least 0.05 mm but no greater than 10 mm, more preferably at least 0.05 mm but no greater than 7 mm, and particularly at least 0.05 mm but no greater than 3 mm.

Crosslinking Step

It is preferable to carry out a crosslinking step of carrying out crosslinking by a thermal reaction (thermal crosslinking) after a step of forming a relief-forming layer. In the case of photocrosslinking, there is a restriction due to the absorbance of the resin composition for laser engraving, and it is difficult to uniformly crosslink a film having a thickness of about 1 mm. For example, in the case of a resin composition for laser engraving containing carbon black, since it is difficult for excitation light for photocrosslinking to reach the interior of the resin composition, thermal crosslinking is preferable.

In order to obtain desired physical properties for a printing plate by a crosslinking reaction of Components A to C, it is important to control the speed of a chain-polymerization reaction between (Component E) chain-polymerizable monomers, self-condensation of an alkoxysilane compound of Component A to Component C, and a sequential crosslinking reaction of an alkoxysilane compound and a crosslinking polymer, which is one type of Component D.

The chain-polymerization reaction is known to a person skilled in the art; it is a polymerization reaction that proceeds by a chain mechanism in which a monomer reacts with an active site at a growing chain terminal so that it grows and, as a result, a similar active site is formed, and is different from a sequential crosslinking reaction.

Component A to Component C and the crosslinking polymer undergo crosslinking by a sequential crosslinking reaction. The sequential crosslinking reaction is also known to a person skilled in the art, and polycondensation or polyaddition is representative. In the sequential crosslinking reaction, not only are an alkoxysilane compound and a crosslinking polymer involved in a polymer formation reaction at the same time, but also oligomers formed during the reaction process also have reactive groups, and they also react with each other. The chain-polymerization reaction and the sequential crosslinking reaction are described in, for example, 'Kiso Kobunshi Kagaku (Basic Polymer Science)' Ed. by the Society of Polymer Science, Japan, $2^{nd}$ edition, 2006, Tokyo Kagaku Dojin.

After the layer formation step or the crosslinking step mentioned above, as necessary, a protection film may be laminated on the relief-forming layer. Laminating may be carried out by compression-bonding the protection film and the relief-forming layer by means of heated calendar rollers, etc. or putting a protection film into intimate contact with a relief-forming layer whose surface is impregnated with a small amount of solvent.

When a protection film is used, a method in which a relief-forming layer is first layered on a protection film and a support is then laminated may be employed.

When an adhesive layer is provided, it may be dealt with by use of a support coated with an adhesive layer. When a slip coat layer is provided, it may be dealt with by use of a protection film coated with a slip coat layer.

Mechanical Properties of Crosslinked Relief-Forming Layer

The mechanical properties and thermophysical properties (the two are together called 'plate physical properties') of a crosslinked relief-forming layer are very important properties for high definition flexographic printing.

Since a load is concentrated on a small dot having a high aspect ratio shape during flexographic printing, the amount of deformation due to stress tends to increase. When the amount of deformation due to stress is large, it is difficult to obtain a desired printing performance. The amount of deformation due to stress is determined by the stress and the elastic modulus of a relief layer of a flexographic printing plate. In flexographic printing, the time for which a stress is applied to each dot is determined by printing speed, plate body diameter, printing pressure, etc., and is approximately from 0.001 sec to 0.1 sec. Therefore, the elastic modulus necessary for flexographic printing can be calculated by measurement of dynamic viscoelasticity in the range of 10 Hz to 1,000 Hz. The elastic modulus is expressed as a storage modulus (E').

In order to reduce the amount of deformation due to stress during printing, with the storage modulus (E') at a room temperature of 25° C. and 100 Hz as a representative value, the storage modulus (E') is preferably 1 MPa or greater. It is more preferably 3 MPa or greater, yet more preferably 5 MPa or greater, and particularly preferably 7 MPa or greater. Since the storage modulus (E') depends on the temperature, it is necessary to appropriately carry out calibration of temperature in a dynamic viscoelasticity measurement. Moreover, the temperature displayed in a dynamic viscoelasticity measurement might be a value that is not exactly the temperature of the sample itself, and as a method for carrying out calibration of temperature, it is preferable to attach a thermocouple to the sample itself and measure the temperature.

On the other hand, it is clear that in an unengraved solid printed image area it is necessary for a flexographic plate shape to deform and follow the fine surface shape of a printing substrate in order to achieve uniform ink transfer. In order to follow fine asperities of a printing substrate in a solid printed image area, where it is difficult to apply printing pressure, it is preferable for the elastic modulus to be small. In order to achieve minimum necessary ink transfer properties, it is preferable for the storage modulus (E') to be no greater than 30 MPa. It is more preferable for it to be no greater than 25 MPa, yet more preferably no greater than 20 MPa, and particularly preferably no greater than 15 MPa.

Measurement of storage modulus (E') is carried out using dynamic viscoelasticity measurement equipment. The equipment, sample, measurement conditions, etc. may be referred to in JISK7244-1.

A relief (-forming) layer obtained using the resin composition for laser engraving of the present invention has excellent stability of flexibility over time required for a flexographic printing plate. The stability of flexibility over time may be evaluated as follows.

Firstly, the storage modulus ($E_0$') of a crosslinked relief-forming layer immediately after preparation is measured. For example, a storage modulus at a room temperature of 25° C. and 100 Hz is defined as a representative value.

Subsequently, the same crosslinked relief-forming layer as that used for measuring the storage modulus ($E_0$') is subjected to an accelerated test (heating in an oven at 70° C. for 10 days), and the storage modulus ($E_1$') is measured again.

A change ΔE' ($|E_0'-E_1'|$) in the storage modulus is finally calculated, and the stability of flexibility over time can thus be evaluated.

The change ΔE' in storage modulus is preferably no greater than 15 MPa, more preferably no greater than 10 MPa, and yet more preferably no greater than 5 MPa. When in the above-mentioned range, storage stability is excellent.

In order to carry out printing with a small dot high aspect ratio shape, toughness that is resistant to breaking is necessary. Since a load is easily concentrated on a small dot high aspect ratio shape, bending easily occurs. Increasing the tensile breaking strength and the elongation at break as an indicator for toughness can prevent bending of a small dot high aspect ratio shape. Tensile breaking strength is the stress required for tensile breaking, and elongation at break is the elongation when breaking occurs. In order to prevent a high aspect ratio convex shape of the smallest dot of a high definition image having a resolution of 2,400 dpi or greater from bending during printing, it has been established that the tensile breaking strength of a flexographic printing plate precursor is preferably 0.6 MPa or greater. It is more preferably 0.8 MPa or greater, yet more preferably 1 MPa or greater, and particularly preferably 1.5 MPa or greater. There is no particular upper limit, but it is generally no greater than 10 MPa.

Furthermore, it is necessary for maximum elongation L at tensile break to be 30% or greater. It is preferably 45% or greater, more preferably 60% or greater, and particularly preferably 80% or greater. There is no particular upper limit, but it is generally no greater than 300%.

Maximum elongation L at tensile break is measured using a tensile tester. The test is carried out in accordance with JIS K6251 with respect to the equipment, sample, measurement conditions, etc.

When the above-mentioned numerical ranges are represented by mathematical expressions, with regard to the laser engraving type flexographic printing plate precursor of the present invention, the storage modulus E' (MPa) at 25° C. of the crosslinked relief-forming layer at a frequency of 100 Hz satisfies expression (a) below, and the maximum elongation L (%) at tensile break at 25° C. satisfies expression (b) below.

$$1 \leq E' \leq 30 \qquad (a)$$

$$30 \leq L \leq 300 \qquad (b)$$

The above-mentioned storage modulus E' is measured at a frequency of 100 Hz at 25° C.

When the storage modulus E' is less than 1 MPa, the amount of deformation of a small dot is large and the density of a halftone area is unstable, and when it exceeds 30 MPa the ink transfer properties of a solid printed area are degraded.

The above-mentioned maximum elongation L at tensile break is measured under temperature- and humidity-controlled conditions of a room temperature of 25° C. and a humidity of 40% to 60%. One example of the measurement method is shown in Examples.

When the maximum elongation L is less than 30%, a small dot easily bends, and when it exceeds 300% thermal deformation during laser engraving tends to occur easily.

It is preferable in this way that, while taking into consideration physical properties commensurate with an intended application, a resin composition for laser engraving comprising (Component A to Component C) alkoxysilane compounds, (Component D) a binder polymer, and (Component E) a chain-polymerizable monomer is prepared according to the intended purpose, and this is subjected to crosslinking by a chain polymerization reaction and a sequential crosslinking reaction to thus form a crosslinked relief-forming layer above a support.

The tensile breaking strength and elongation at break may be obtained by examining the relationship between stress and strain. Any measurement equipment may be used as long as it can measure stress and displacement at the same time, but one that is suitable for measuring a sample such as rubber exhibiting large elongation at low stress is preferable. Unless the temperature and humidity are particularly specified, these physical properties of a flexographic printing plate precursor are values measured under conditions of a room temperature of 23° C. to 25° C. and a humidity of 40% to 60%.

Thermophysical Properties of Flexographic Printing Plate Precursor

In order to form a small dot high aspect ratio shape, it is necessary to prevent deformation due to heat transmitted to an area surrounding a part engraved by laser engraving. It is therefore preferable for the softening temperature (Tm) of the flexographic printing plate precursor to be high. However, it has been found that, when the amount of heat required for engraving is large, since the temperature of a surrounding area increases accordingly, a small dot high aspect ratio shape cannot be formed just by making the softening temperature high. The present inventors have found that it is most important for the softening temperature to be relatively high compared with the thermal decomposition temperature, that is, for the softening temperature (Tm) to be higher than the thermal decomposition temperature (Td), or it is necessary for it not to be lower than Td by 50° C. or greater. It is preferable for Tm not to be lower than Td by 20° C. or greater, and it is yet more preferable for Tm not to be lower than Td. By satisfying such a relationship between the thermal decomposition temperature (Td) and the softening temperature (Tm), a balance can be achieved between ablation due to irradiation with a laser and shape retention in surrounding areas.

Furthermore, since the larger the amount of heat required for engraving the slower the scanning speed needs to be, productivity is degraded. It is therefore preferable for the thermal decomposition temperature to be low. On the other hand, when a flexographic printing plate precursor is produced by thermal curing, it is necessary for the thermal decomposition temperature to be higher than the temperature of the thermal curing treatment. It is therefore preferable for the thermal decomposition temperature (Td) of a flexographic printing plate precursor to be 150° C. to 450° C. It is more preferably 150° C. to 350° C., and particularly preferably 200° C. to 300° C.

Thermal decomposition temperature (Td) and softening temperature (Tm) can be determined by thermogravimetric/differential thermal analysis (TG-DTA) measurement. In the present invention, the thermal decomposition temperature (Td) is defined as the temperature at which the weight decreases by 10%. Although it is necessary to differentiate Tm from glass transition temperature (Tg), in the case of a soft relief-forming layer such as a flexographic printing plate, since Tg is no greater than room temperature, by carrying out a thermogravimetric/differential thermal analysis (TG-DTA) measurement at a temperature of 30° C. or higher, confusion of Tg and Tm can be avoided. A substance absorbs heat upon melting or softening, and in differential thermal analysis measurement the temperature at which heat absorption occurs can be measured. In the present invention, a temperature at which a heat absorption peak at a temperature higher than 30° C. and lower than Td is exhibited is defined as Tm. When there are a plurality of heat absorption peaks, the temperature that is the closest to Td is defined as Tm. When there is no heat absorption peak observed, Tm can be considered to be higher than Td.

In the laser engraving type flexographic printing plate precursor of the present invention, when the above-mentioned relationships are represented by mathematical expressions, it is preferable for the thermal decomposition temperature (Td)(° C.) of the crosslinked relief-forming layer to satisfy expression (c) below, and for the softening temperature (Tm)(° C.) of the crosslinked relief-forming layer to be 200° C. or higher or to satisfy expression (d) below.

$$150 \leq Td \leq 350 \qquad (c)$$

$$Td \leq Tm \qquad (d)$$

Relief Printing Plate and Process for Making Same

In the present invention, the process for making a relief printing plate preferably comprises an engraving step of forming a relief-forming layer by laser-engraving the (crosslinked) relief-forming layer.

The relief printing plate made by laser-engraving may suitably employ an aqueous ink when printing.

Engraving Step

An engraving step in a method of making a relief printing plate is a step of laser-engraving a crosslinked relief-forming layer of a relief printing plate precursor for laser engraving to thus form a relief layer. Specifically, it is preferable to engrave a crosslinked relief-forming layer that has been crosslinked by irradiation with laser light according to a desired image, thus forming a relief layer. Furthermore, a step in which a crosslinked relief-forming layer is subjected to scanning irradiation by controlling a laser head using a computer in accordance with digital data of a desired image can preferably be cited.

This engraving step preferably employs an infrared laser. When irradiated with the infrared laser, molecules in the crosslinked relief-forming layer undergo molecular vibration, thus generating heat. When a high power laser such as a carbon dioxide laser or a YAG laser is used as the infrared laser, a large quantity of heat is generated in the laser-irradiated area, and molecules in the crosslinked relief-forming layer undergo molecular scission or ionization, thus being selectively removed, that is, engraved. The advantage of laser engraving is that, since the depth of engraving can be set freely, it is possible to control the structure three-dimensionally. For example, for an area where fine halftone dots are printed, carrying out engraving shallowly or with a shoulder prevents the relief from collapsing due to printing pressure, and for a groove area where a fine outline character is printed, carrying out engraving deeply makes it difficult for ink the groove to be blocked with ink, thus enabling breakup of an outline character to be suppressed.

In particular, when engraving is carried out using an infrared laser that corresponds to the absorption wavelength of the photothermal conversion agent, it becomes possible to selectively remove the crosslinked relief-forming layer at higher sensitivity, thus giving a relief layer having a sharp image.

As the infrared laser used in the engraving step, from the viewpoint of productivity, cost, etc., a carbon dioxide laser ($CO_2$ laser) or a semiconductor laser is preferable. In particular, a fiber-coupled semiconductor infrared laser (FC-LD) is preferably used. In general, compared with a $CO_2$ laser, a semiconductor laser has higher efficiency laser oscillation, is less expensive, and can be made smaller. Furthermore, it is easy to form an array due to the small size. Moreover, the shape of the beam can be controlled by treatment of the fiber.

With regard to the semiconductor laser, one having a wavelength of 700 to 1,300 nm is preferable, one having a wavelength of 800 to 1,200 nm is more preferable, one having a wavelength of 860 to 1,200 nm is yet more preferable, and one having a wavelength of 900 to 1,100 nm is particularly preferable.

Furthermore, the fiber-coupled semiconductor laser can output laser light efficiently by being equipped with optical fiber, and this is effective in the engraving step in the present invention. Moreover, the shape of the beam can be controlled by treatment of the fiber. For example, the beam profile may be a top hat shape, and energy can be applied stably to the plate face. Details of semiconductor lasers are described in 'Laser Handbook 2nd Edition' (The Laser Society of Japan), 'Jitsuyo Laser Gijutsu' (Applied Laser Technology) (The Institute of Electronics and Communication Engineers), etc.

Moreover, a plate making equipment comprising a fiber-coupled semiconductor laser that can be used suitably in the process for making a relief printing plate of the present invention is described in detail in JP-A-2009-172658 and JP-A-2009-214334, and may be used for the method of making the relief printing plate according to the present invention.

The process for making a relief printing plate of the present invention may as necessary further comprise, subsequent to the engraving step, a rinsing step, a drying step, and/or a post-crosslinking step. Rinsing step is a step of rinsing the engraved surface after engraving with water or a liquid containing water as a main component. Drying step is a step of drying the engraved relief layer. Post-crosslinking step is a step of further crosslinking the relief layer by applying energy to the engraved relief layer.

Rinsing step is described below.

After the above-mentioned engraving step, since engraving residue is attached to the surface of the relief layer, a rinsing step of washing off engraving residue by rinsing the surface with water or an aqueous liquid containing water as a main component is preferably added. Examples of rinsing means include a method in which washing is carried out with tap water, a method in which high pressure water is spray-jetted, and a method in which the engraved surface is brushed in the presence of mainly water using a batch or conveyor brush type washout machine known as a photosensitive resin letterpress plate processor, and when slime due to engraving residue cannot be eliminated, a rinsing liquid to which a soap or a surfactant is added may be used.

When the rinsing step of rinsing the engraved surface is carried out, it is preferable to add a drying step of drying an engraved crosslinked relief-forming layer so as to evaporate rinsing liquid.

Furthermore, as necessary, a post-crosslinking step for further crosslinking the crosslinked relief-forming layer may be added. By carrying out the post-crosslinking step, which is an additional crosslinking step, it is possible to further strengthen the relief formed by engraving.

The pH of the rinsing liquid that can be used in the present invention is preferably at least 9, more preferably at least 10, and yet more preferably at least 11. The pH of the rinsing liquid is preferably no greater than 14, more preferably no greater than 13, yet more preferably no greater than 12.5. When in the above-mentioned range, handling is easy.

In order to set the pH of the rinsing liquid in the above-mentioned range, the pH may be adjusted using an acid and/or a base as appropriate, and the acid or base used is not particularly limited.

The rinsing liquid that can be used in the present invention preferably comprises water as a main component.

The rinsing liquid may contain as a solvent other than water a water-miscible solvent such as an alcohol, acetone, or tetrahydrofuran.

The aqueous liquid mentioned above, that is a rinsing liquid, preferably comprises a surfactant.

From the viewpoint of removability of engraving residue and little influence on a relief printing plate, preferred examples of the surfactant that can be used in the present invention include betaine compounds (amphoteric surfactants) such as a carboxybetaine compound, a sulfobetaine compound, a phosphobetaine compound, an amine oxide compound, and a phosphine oxide compound.

The betaine compound is preferably a compound represented by Formula (1) below and/or a compound represented by Formula (2) below.

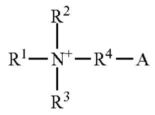

(1)

(In Formula (1), $R^1$ to $R^3$ independently denote a monovalent organic group, $R^4$ denotes a single bond or a divalent linking group, A denotes $PO(OR^5)O^-$, $OPO(OR^5)O^-$, $O^-$, $COO^-$, or $SO_3^-$, $R^5$ denotes a hydrogen atom or a monovalent organic group, and two or more groups of $R^1$ to $R^3$ may be bonded to each other to form a ring.)

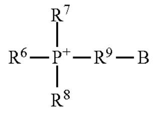

(2)

(In Formula (2), $R^6$ to $R^8$ independently denote a monovalent organic group, $R^9$ denotes a single bond or a divalent linking group, B denotes $PO(OR^{19})O^-$, $OPO(OR^{10})O^-$, $O^-$, $COO^-$, or $SO_3^-$, $R^{10}$ denotes a hydrogen atom or a monovalent organic group, and two or more groups of $R^6$ to $R^8$ may be bonded to each other to form a ring.)

The compound represented by Formula (1) above or the compound represented by Formula (2) above is preferably a carboxybetaine compound, a sulfobetaine compound, a phosphobetaine compound, an amine oxide compound, or a phosphine oxide compound. In the present invention, the structures of N═O of an amine oxide compound and P═O of a phosphine oxide compound are considered to be $N^+$—$O^-$ and $P^+$—$O^-$ respectively.

$R^1$ to $R^3$ in Formula (1) above independently denote a monovalent organic group. Two or more groups of $R^1$ to $R^3$ may be bonded to each other to form a ring, but it is preferable that no ring is formed.

The monovalent organic group denoted by $R^1$ to $R^3$ is not particularly limited, but is preferably an alkyl group, a hydroxy group-containing alkyl group, an alkyl group having an amide bond in an alkyl chain, or an alkyl group having an ether bond in an alkyl chain, and is more preferably an alkyl group, a hydroxy group-containing alkyl group, or an alkyl group having an amide bond in an alkyl chain.

Furthermore, the alkyl group as the monovalent organic group may have a straight-chain, branched, or cyclic structure.

Moreover, it is particularly preferable that two of $R^1$ to $R^3$ are methyl groups, that is, a compound represented by Formula (1) has an N,N-dimethyl structure. When it has the above-mentioned structure, particularly good rinsing properties are exhibited . . . .

$R^4$ in Formula (1) above denotes a single bond or a divalent linking group, and is a single bond when a compound represented by Formula (1) is an amine oxide compound.

The divalent linking group denoted by $R^4$ is not particularly limited, and is preferably an alkylene group or a hydroxy group-containing alkylene group, more preferably an alkylene group having 1 to 8 carbons or a hydroxy group-containing alkylene group having 1 to 8 carbons, and yet more preferably an alkylene group having 1 to 3 carbons or a hydroxy group-containing-alkylene group having 1 to 3 carbons.

A in Formula (1) above denotes $PO(OR^5)O^-$, $OPO(OR^5)O^-$, $O^-$, $COO^-$, or $SO_3^-$, and is preferably $O^-$, $COO^-$, or $SO_3^-$, and more preferably $COO^-$.

When $A^-$ is $O^-$, $R^4$ is preferably a single bond.

$R^5$ in $PO(OR^5)O^-$ and $OPO(OR^5)O^-$ denotes a hydrogen atom or a monovalent organic group, and is preferably a hydrogen atom or an alkyl group having one or more unsaturated fatty acid ester structures.

Furthermore, $R^4$ is preferably a group that does not have $PO(OR^5)O^-$, $OPO(OR^5)O^-$, $O^-$, $COO^-$, or $SO_3^-$.

$R^6$ to $R^8$ in Formula (2) above independently denote a monovalent organic group. Two or more groups of $R^6$ to $R^8$ may be bonded to each other to form a ring, but it is preferable that no ring is formed.

The monovalent organic group denoted by $R^6$ to $R^8$ is not particularly limited, but is preferably an alkyl group, an alkenyl group, an aryl group, or a hydroxy group, and more preferably an alkenyl group, an aryl group, or a hydroxy group.

Furthermore, the alkyl group as the monovalent organic group may have a straight-chain, branched, or cyclic structure.

It is particularly preferable that two of $R^6$ to $R^8$ are aryl groups.

$R^9$ in Formula (2) above denotes a single bond or a divalent linking group, and is a single bond when a compound represented by Formula (2) is a phosphine oxide compound.

The divalent linking group denoted by $R^9$ is not particularly limited, but is preferably an alkylene group or a hydroxy group-containing alkylene group, more preferably an alkylene group having 1 to 8 carbons or a hydroxy group-containing alkylene group having 1 to 8 carbons, and yet more preferably an alkylene group having 1 to 3 carbons or a hydroxy group-containing alkylene group having 1 to 3 carbons.

B in Formula (2) above denotes $PO(OR^{10})O^-$, $OPO(OR^{10})O^-$, $O^-$, $COO^-$, or $SO_3^-$, and is preferably $O^-$.

$R^9$ is preferably a single bond when $B^-$ is $O^-$.

$R^{10}$ in $PO(OR^{10})O^-$ and $OPO(OR^{10})O^-$ denotes a hydrogen atom or a monovalent organic group, and is preferably a hydrogen atom or an alkyl group having one or more unsaturated fatty acid ester structures.

Furthermore, $R^9$ is preferably a group that does not have $PO(OR^{10})O^-$, $OPO(OR^{10})O^-$, $O^-$, $COO^-$, or $SO_3^-$.

(3)

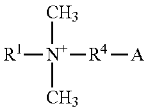

(In Formula (3), $R^1$ denotes a monovalent organic group, $R^4$ denotes a single bond or a divalent linking group, A denotes $PO(OR^5)O^-$, $OPO(OR^5)O^-$, $O^-$, $COO^-$, or $SO_3^-$, and $R^5$ denotes a hydrogen atom or a monovalent organic group.)

$R^1$, A, and $R^4$ in Formula (3) have the same meanings as $R^1$, A, and $R^4$ in Formula (1) above, and preferred ranges are also the same.

A compound represented by Formula (2) is preferably a compound represented by Formula (4) below.

(4)

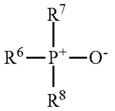

(In Formula (4), $R^6$ to $R^8$ independently denote an alkyl group, an alkenyl group, an aryl group, or a hydroxy group. In addition, not all of $R^6$ to $R^8$ are the same groups.)

$R^6$ to $R^8$ in Formula (4) above independently denote an alkyl group, an alkenyl group, an aryl group, or a hydroxy group, and are preferably an alkenyl group, an aryl group, or a hydroxy group.

Specific examples of the compound represented by Formula (1) and the compound represented by Formula (2) include the compounds below.

(1-A)

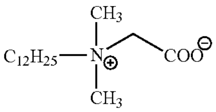

(1-B)

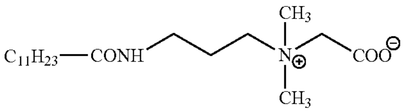

(1-C)

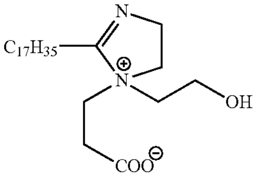

(1-D)

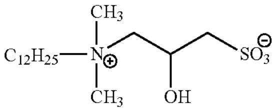

(1-E)

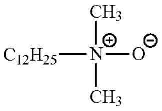

(1-F)

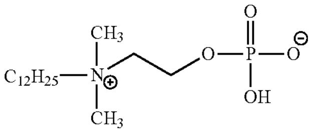

(1-G)

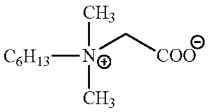

(1-H)

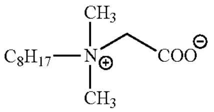

(1-I)

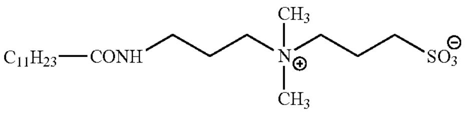

(1-J)

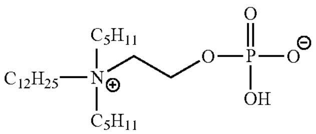

(1-K)

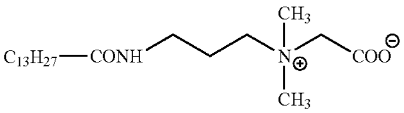

(1-L)

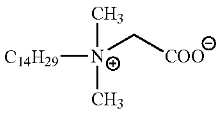

(1-M)

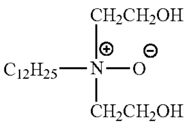

(1-N)

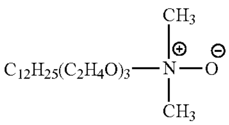

-continued (1-O)

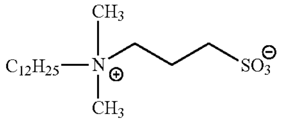

(1-P)

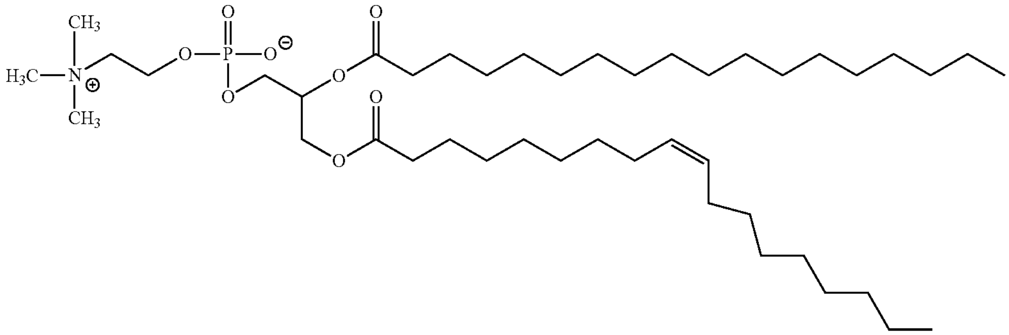

(1-Q)

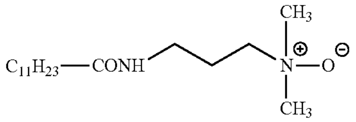

(2-A)

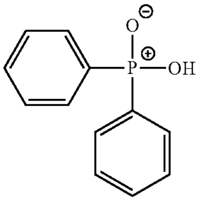

(2-B)

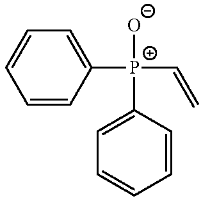

Furthermore, examples of the surfactant also include known anionic surfactants, cationic surfactants, amphoteric surfactants, and nonionic surfactants. Moreover, a fluorine-based or silicone-based nonionic surfactant may also be used in the same manner.

With regard to the surfactant, one type may be used on its own or two or more types may be used in combination.

It is not necessary to particularly limit the amount of surfactant used, but it is preferably 0.01 to 20 wt % relative to the total weight of the rinsing liquid, and more preferably 0.05 to 10 wt %.

The relief printing plate having a relief layer on a surface of any substrate such as a support etc. may be produced as described above.

From the viewpoint of satisfying suitability for various aspects of flexographic printing, such as abrasion resistance and ink transfer properties, the thickness of the relief layer of the relief printing plate is preferably at least 0.05 mm but no greater than 10 mm, more preferably at least 0.05 mm but no greater than 7 mm, and particularly preferably at least 0.05 mm but no greater than 3 mm.

Furthermore, a Shore A hardness of the relief layer of the relief printing plate is preferably at least 50° but no greater than 90°. When the Shore A hardness of the relief layer is at least 50°, even if fine halftone dots formed by engraving receive a strong printing pressure from a letterpress printer, they do not collapse and close up, and normal printing can be carried out. Furthermore, when the Shore A hardness of the relief layer is no greater than 90°, even for flexographic printing with kiss touch printing pressure it is possible to prevent patchy printing in a solid printed part.

The Shore A hardness in the present specification is a value measured by a durometer (a spring type rubber hardness meter) that presses an indenter (called a pressing needle or indenter) into the surface of a measurement target so as to deform it, measures the amount of deformation (indentation depth), and converts it into a numerical value.

In accordance with the present invention, there can be provided a resin composition for laser engraving that can suppress scattering of residue during engraving, has excellent rinsing properties for engraving residue, and can form a relief-forming layer having excellent stability of flexibility over time, a relief printing plate precursor for laser engraving comprising a relief-forming layer formed from the resin composition for laser engraving, a process for producing a relief printing plate precursor for laser engraving, and a process for making a relief printing plate.

EXAMPLES

The present invention is explained in further detail below by reference to Examples, but the present invention should not be construed as being limited to these Examples. The weight-average molecular weight (Mw) of a polymer in the Examples is a value measured by a GPC method unless otherwise specified. Furthermore, 'parts' and '%' in the description below mean 'parts by weight' and 'wt %' unless otherwise specified.

Example 1

Preparation of Relief Printing Plate Precursor for Laser Engraving

Binder polymer, chain-polymerizable monomer, alkoxysilane compounds of Component A to C, and other materials described in Table 1 were mixed at the proportions below.

| | |
|---|---|
| (Component A to Component C): compounds a-2 and c-1 above (proportions given in Table 1) | 20 parts |
| (Component D) binder polymer; polyvinyl butyral | 29 parts |
| (Component E) chain-polymerizable monomer; dipentaerythritol hexaacrylate | 15 parts |
| (component F) polymerization initiator; Perbutyl Z (NOF Corporation) | 1 part |
| (Component G) plasticizer; tributyl citrate | 24 parts |
| (Component H) photothermal conversion agent; carbon black | 10 parts |
| (Component I) crosslinking catalyst; 1,8-diazabicyclo[5.4.0]undec-7-ene | 1 part |
| (Solvent) propylene glycol monomethyl acetate | 20 parts |

Components D to I and solvent above were first placed in a three-necked flask equipped with a stirring blade and a condenser, and dissolved by heating at 70° C. for 120 minutes while stirring. After this solution was set at 40° C., Components A to C and component F above were added, and stirring was carried out for a further 10 minutes, thus giving a flowable resin composition for laser engraving.

A 3 mm thick spacer (frame) was placed on a PET substrate, and the above resin composition for laser engraving was kept at 70° C. and cast gently so that it did not flow out from the spacer (frame). A coating was placed in an oven, kept at 95° C. for 1 hour, and then heated at 85° for 3 hours, thus giving a relief printing plate precursor for laser engraving.

The thickness of the crosslinked relief-forming layer thus obtained was 1 mm.

Evaluation

Measurement of Storage Modulus E'

The conditions for measurement of storage modulus (E') are shown below.

Equipment used for measurement of dynamic viscoelasticity (DMA) was a DMS6100 manufactured by SII Nanotechnology Inc. A sample piece was prepared by forming a crosslinked relief-forming layer on a support and then peeling it off from the support.

The measurement conditions were such that a sample piece having a width of 6 mm was held by a sample holder, and the measurement length was 10 mm. The thickness was 1 mm. While heating was carried out at a rate of temperature increase of 4° C./min from −30° C. to 50° C., dynamic viscoelasticity at 100 Hz was measured in tensile mode with a maximum strain rate of 0.1%. The difference between the temperature shown by a thermocouple affixed to the sample piece and the temperature displayed by the equipment was measured, calibration of the temperature of the equipment was carried out, and a 100 Hz storage modulus (E') at 25° C. was determined.

As forced aging conditions, heating was carried out in an oven at 70° C. for 10 days, and measurement of viscoelasticity was then carried out in the same manner as above. Change in the 100 Hz storage modulus at 25° C. was defined as ΔE' (MPa).

The level acceptable for stability of flexibility over time for a printing plate is a ΔE' of 15 MPa or below.

Evaluation of Scattering of Residue

A 10 cm square was engraved at 500 μm using Helios 6010 laser engraving equipment (Stork). Laser output was 500 W, and drum rotational speed was 1,200 rpm. The amount of residue scattered was evaluated by counting the number of pieces of residue scattered onto 20 cm×1 m of PET affixed to a hood part.

Excellent: no scattering of residue

Good: 1 piece

Poor: 2 or more pieces

Excellent and Good are acceptable levels.

Evaluation of Rinsing Properties

A rinsing liquid was prepared by mixing water, a 10 wt % aqueous solution of sodium hydroxide, and betaine compound (1-B) below so that the pH was 12 and the content of betaine compound (1-B) was 1 wt % of the total rinsing liquid.

(1-B)

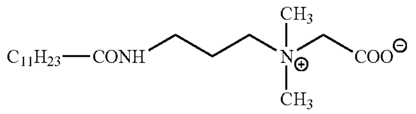

The rinsing liquid thus prepared was dropped (about 100 mL/$m^2$) by means of a dropper onto a plate material engraved with a 2,400 dpi 2×2 dot halftone pattern on a 10 cm square so that the plate surface became uniformly wet, it was allowed to stand for 1 min, and then rubbed using a toothbrush (Clinica Toothbrush Flat, Lion Corporation) 20 times (30 sec) in parallel to the plate with a load of 200 gf. Subsequently, the plate face was washed with running water, moisture of the plate face was removed, and it was dried naturally for approximately 1 hour.

Unremoved residue on the plate was evaluated by examining the rinsed plate surface using a 100× magnification microscope (Keyence). Evaluation criteria were as follows.

Poor: residue adhering to the entire plate face.

Fair: slight residue remaining on convex parts of plate image, and residue remaining in bottom parts of image (concave parts).

Good: slight residue remaining only in bottom parts of image (concave parts).

Excellent: no residue at all remaining on plate or bottom parts of image (concave parts).

Good and Excellent are acceptable levels.

Examples 2 to 29 and Comparative Examples 1 to 4

Samples of Examples 2 to 29 and Comparative Examples 1 to 4 were prepared in the same manner as in Example 1 except that materials shown in Table 1 were used.

Materials shown in Table 1 are as follows.

(Component A) to (Component C)

Compounds of Component A to Component C described above were used.

(Component D) Binder Polymer

PVB: polyvinyl butyral Mw 90,000 (Denka Butyral #3000-2, Denki Kagaku Kogyo Kabushiki Kaisha)

SI: styrene isoprene block copolymer (Quintac 3421, Nippon Zeon Corporation)

(Component E) Chain-Polymerizable Monomer

DPHA: dipentaerythritol hexaacrylate (Daicel-Cytec Company Ltd.)

DCP: tricyclodecanedimethanol dimethacrylate (Shin-Nakamura Chemical Co., Ltd.)

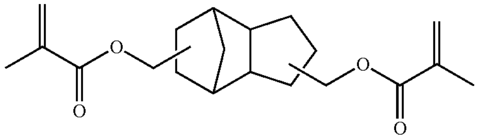

TMMT: tetramethylolmethane tetraacrylate (Daicel-Cytec Company Ltd.)

TMPT: trimethylolpropane triacrylate (Daicel-Cytec Company Ltd.)

(Component F) Polymerization Initiator

PBZ: Perbutyl Z (t-butylperoxybenzoate, NOF Corporation)

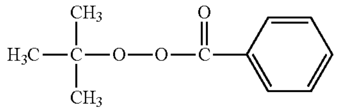

(Component G) Plasticizer

G-1: tributyl citrate (Component H) Photothermal Conversion Agent

H-1: Ketjen Black EC600JD (carbon black, Lion Corporation)

(Component I) Crosslinking Catalyst

DBU: 1,8-diazabicyclo[5.4.0]undec-7-ene (Wako Pure Chemical Industries, Ltd.)

TABLE 1

| Example Comparative Example | Component A 1 or 2 alkoxy groups Type | Ratio (%) | Component B 3 alkoxy groups Type | Ratio (%) | Component C 4 alkoxy groups Type | Ratio (%) | Total of Components A to C (parts) | Component D binder polymer Type | Parts | Component E chain-polymerizable monomer Type | Parts |
|---|---|---|---|---|---|---|---|---|---|---|---|
| Ex. 1 | a-2 | 80 | — | — | C-1 | 20 | 20 | PVB | 29 | DPHA | 15 |
| Ex. 2 | a-2 | 80 | b-6 | 20 | — | — | 20 | PVB | 29 | DPHA | 15 |
| Ex. 3 | a-2 | 80 | b-10 | 20 | — | — | 20 | PVB | 29 | DPHA | 15 |
| Ex. 4 | a-2 | 80 | b-1 | 20 | — | — | 20 | PVB | 29 | DPHA | 15 |
| Ex. 5 | a-2 | 80 | b-3 | 20 | — | — | 20 | PVB | 29 | DPHA | 15 |
| Ex. 6 | a-2 | 80 | b-7 | 20 | — | — | 20 | PVB | 29 | DPHA | 15 |
| Ex. 7 | a-2 | 80 | b-8 | 20 | — | — | 20 | PVB | 29 | DPHA | 15 |
| Ex. 8 | a-6 | 80 | b-6 | 20 | — | — | 20 | PVB | 29 | DPHA | 15 |
| Ex. 9 | a-7 | 80 | b-6 | 20 | — | — | 20 | PVB | 29 | DPHA | 15 |
| Ex. 10 | a-8 | 80 | b-6 | 20 | — | — | 20 | PVB | 29 | DPHA | 15 |
| Ex. 11 | a-6 | 80 | b-6 | 20 | — | — | 20 | PVB | 29 | DCP | 15 |
| Ex. 12 | a-6 | 80 | b-6 | 20 | — | — | 20 | PVB | 29 | TMMT | 15 |
| Ex. 13 | a-6 | 80 | b-6 | 20 | — | — | 20 | PVB | 29 | TMPT | 15 |
| Ex. 14 | a-7 | 94 | b-6 | 6 | — | — | 20 | PVB | 29 | DPHA | 15 |
| Ex. 15 | a-7 | 86 | b-6 | 14 | — | — | 20 | PVB | 29 | DPHA | 15 |
| Ex. 16 | a-7 | 50 | b-6 | 50 | — | — | 20 | PVB | 29 | DPHA | 15 |
| Ex. 17 | a-7 | 61 | b-6 | 39 | — | — | 20 | PVB | 29 | DPHA | 15 |
| Ex. 18 | a-9 | 80 | b-1 | 20 | — | — | 20 | PVB | 29 | DPHA | 15 |
| Ex. 19 | a-1 | 20 | b-12 | 80 | — | — | 20 | PVB | 29 | DPHA | 15 |
| Ex. 20 | a-3 | 80 | b-1 | 20 | — | — | 20 | PVB | 29 | DPHA | 15 |
| Ex. 21 | a-11 | 60 | b-6 | 40 | — | — | 20 | PVB | 29 | DPHA | 15 |
| Ex. 22 | a-11 | 60 | b-10 | 40 | — | — | 20 | PVB | 29 | DPHA | 15 |
| Ex. 23 | a-13 | 80 | b-6 | 20 | — | — | 20 | PVB | 29 | DPHA | 15 |
| Ex. 24 | a-13 | 80 | b-15 | 20 | — | — | 20 | PVB | 29 | DPHA | 15 |
| Ex. 25 | a-2 | 80 | b-16 | 20 | — | — | 20 | PVB | 29 | DPHA | 15 |
| Ex. 26 | — | — | b-1 | 80 | C-1 | 20 | 20 | PVB | 29 | DPHA | 15 |
| Ex. 27 | a-2 | 80 | — | — | C-1 | 20 | 20 | SI | 29 | DPHA | 15 |
| Ex. 28 | a-2 | 80 | b-6 | 20 | — | — | 20 | SI | 29 | DPHA | 15 |
| Ex. 29 | a-2 | 80 | b-10 | 20 | — | — | 20 | SI | 29 | DPHA | 15 |
| Comp. Ex. 1 | a-2<br>a-6 | 80<br>20 | — | — | — | — | 20 | PVB | 29 | DPHA | 15 |
| Comp. Ex. 2 | — | — | b-7 | 100 | — | — | 20 | PVB | 29 | DPHA | 15 |
| Comp. Ex. 3 | a-2 | 100 | — | | — | — | 20 | PVB | 29 | DPHA | 15 |
| Comp. Ex. 4 | — | — | b-1 | 100 | — | — | 20 | PVB | 29 | DPHA | 15 |

| Example Comparative Example | Component F polymerization initiator Type | Parts | Component G plasticizer Type | Parts | Component H photothermal conversion agent Type | Parts | Component I crosslinking catalyst Type | Parts | Evaluation results ΔE' (MPa) | Residue scattering | Rinsing properties |
|---|---|---|---|---|---|---|---|---|---|---|---|
| Ex. 1 | PBZ | 1 | G-1 | 24 | H-1 | 10 | DBU | 1 | 7 | Excellent | Excellent |
| Ex. 2 | PBZ | 1 | G-1 | 24 | H-1 | 10 | DBU | 1 | 4 | Excellent | Excellent |
| Ex. 3 | PBZ | 1 | G-1 | 24 | H-1 | 10 | DBU | 1 | 4 | Excellent | Excellent |
| Ex. 4 | PBZ | 1 | G-1 | 24 | H-1 | 10 | DBU | 1 | 4 | Excellent | Excellent |
| Ex. 5 | PBZ | 1 | G-1 | 24 | H-1 | 10 | DBU | 1 | 5 | Excellent | Excellent |
| Ex. 6 | PBZ | 1 | G-1 | 24 | H-1 | 10 | DBU | 1 | 6 | Excellent | Excellent |

TABLE 1-continued

| | | | | | | | | | | | |
|---|---|---|---|---|---|---|---|---|---|---|---|
| Ex. 7 | PBZ | 1 | G-1 | 24 | H-1 | 10 | DBU | 1 | 6 | Excellent | Excellent |
| Ex. 8 | PBZ | 1 | G-1 | 24 | H-1 | 10 | DBU | 1 | 2 | Excellent | Excellent |
| Ex. 9 | PBZ | 1 | G-1 | 24 | H-1 | 10 | DBU | 1 | 3 | Excellent | Excellent |
| Ex. 10 | PBZ | 1 | G-1 | 24 | H-1 | 10 | DBU | 1 | 2 | Excellent | Excellent |
| Ex. 11 | PBZ | 1 | G-1 | 24 | H-1 | 10 | DBU | 1 | 3 | Good | Excellent |
| Ex. 12 | PBZ | 1 | G-1 | 24 | H-1 | 10 | DBU | 1 | 2 | Excellent | Excellent |
| Ex. 13 | PBZ | 1 | G-1 | 24 | H-1 | 10 | DBU | 1 | 2 | Excellent | Excellent |
| Ex. 14 | PBZ | 1 | G-1 | 24 | H-1 | 10 | DBU | 1 | 5 | Excellent | Excellent |
| Ex. 15 | PBZ | 1 | G-1 | 24 | H-1 | 10 | DBU | 1 | 2 | Excellent | Excellent |
| Ex. 16 | PBZ | 1 | G-1 | 24 | H-1 | 10 | DBU | 1 | 3 | Excellent | Excellent |
| Ex. 17 | PBZ | 1 | G-1 | 24 | H-1 | 10 | DBU | 1 | 4 | Excellent | Excellent |
| Ex. 18 | PBZ | 1 | G-1 | 24 | H-1 | 10 | DBU | 1 | 6 | Excellent | Excellent |
| Ex. 19 | PBZ | 1 | G-1 | 24 | H-1 | 10 | DBU | 1 | 5 | Excellent | Excellent |
| Ex. 20 | PBZ | 1 | G-1 | 24 | H-1 | 10 | DBU | 1 | 6 | Good | Excellent |
| Ex. 21 | PBZ | 1 | G-1 | 24 | H-1 | 10 | DBU | 1 | 2 | Excellent | Excellent |
| Ex. 22 | PBZ | 1 | G-1 | 24 | H-1 | 10 | DBU | 1 | 2 | Excellent | Excellent |
| Ex. 23 | PBZ | 1 | G-1 | 24 | H-1 | 10 | DBU | 1 | 1 | Excellent | Excellent |
| Ex. 24 | PBZ | 1 | G-1 | 24 | H-1 | 10 | DBU | 1 | 2 | Excellent | Excellent |
| Ex. 25 | PBZ | 1 | G-1 | 24 | H-1 | 10 | DBU | 1 | 2 | Excellent | Excellent |
| Ex. 26 | PBZ | 1 | G-1 | 24 | H-1 | 10 | DBU | 1 | 8 | Excellent | Excellent |
| Ex. 27 | PBZ | 1 | G-1 | 24 | H-1 | 10 | DBU | 1 | 8 | Excellent | Good |
| Ex. 28 | PBZ | 1 | G-1 | 24 | H-1 | 10 | DBU | 1 | 5 | Excellent | Good |
| Ex. 29 | PBZ | 1 | G-1 | 24 | H-1 | 10 | DBU | 1 | 5 | Excellent | Good |
| Comp. Ex. 1 | PBZ | 1 | G-1 | 24 | H-1 | 10 | DBU | 1 | 2 | Poor | Good |
| Comp. Ex. 2 | PBZ | 1 | G-1 | 24 | H-1 | 10 | DBU | 1 | 25 | Good | Good |
| Comp. Ex. 3 | PBZ | 1 | G-1 | 24 | H-1 | 10 | DBU | 1 | 5 | Poor | Good |
| Comp. Ex. 4 | PBZ | 1 | G-1 | 24 | H-1 | 10 | DBU | 1 | 17 | Good | Good |

What is claimed is:

1. A relief printing plate precursor comprising a relief-forming layer formed from a resin composition comprising:

two or more types of compounds selected from the group consisting of (Component A) a compound comprising a silicon atom having a total of one or two alkoxy from the group consisting of an alkoxy group and hydroxy group, (Component B) a compound comprising a silicon atom having a total of three groups selected from the group consisting of an alkoxy group and a hydroxy group, and (Component C) a compound comprising a silicon atom having a total of four groups selected from the group consisting of an alkoxy group and hydroxy group, wherein Component A is represented by Formula (A-1):

$$\{R^2_q(R^1O)_pSi\}_m\text{—}X \qquad \text{(A-1)}$$

wherein p and q are integers of 1 or 2, p+q being 3 is satisfied, m is an integer of 1 to 10, X denotes an m-valent linking group, $R^1$ denotes a hydrogen atom or an alkyl group, and $R^2$ denotes an alkyl group and wherein Component B is represented by Formula (B-1):

$$\{(R^3O)_3Si\}_n\text{—}Y \qquad \text{(B-1)}$$

wherein n is an integer of 1 to 10, Y denotes an hydrogen atom or an alkyl group.

2. The relief printing plate precursor according to claim 1, wherein the resin comprises Component A and Component B.

3. The relief printing plate precursor according to claim 1, wherein X has 2 200 carbons.

4. The relief printing plate prescursor according to claim 1, wherein Y has 2 to 200 carbons.

5. The relief printing plate precursor according to claim 1, wherein the resin composition further comprises a hydroxy group-containing crosslinking polymer as (Component D) a binder polymer.

6. The relief printing plate precursor according to claim 1, wherein the resin composition further comprises (Component E) a chain-polymerizable monomer.

7. The relief printing plate precursor according to claim 1, wherein the resin composition further comprises a compound having an acid dissociation constant for a conjugate acid of 11 to 13 as (Component I) a crosslinking catalyst for promoting formation of a crosslinked structure of Component A to Component C.

8. The relief printing plate precursor according to claim 1, wherein it comprises a crosslinked relief-forming layer formed by crosslinking the relief-forming layer.

9. The relief printing plate precursor according to claim 1, wherein it comprises a crosslinked relief-forming layer formed by thermally crosslinking the relief-forming layer.

10. A process for producing a relief printing plate precursor comprising:

a layer formation step of forming a relief-forming layer from a resin composition; and a crosslinking step of thermally crosslinking the relief-forming layer so as to form a crosslinked relief-forming layer, wherein the resin composition comprises:

two or more types of compounds selected from the group consisting of (Component A) a compound which comprises at least one silicon atom having a total of one or two groups selected from the group consisting of an alkoxy group and a hydroxyl group, (Component B) a compound which comprises at least one silicon atom having a total of three groups selected from the group consisting of an alkoxy group and a hydroxyl group, and (Component C) a compound which comprises a silicon atom having a total of four groups selected from the group consisting of an alkoxy group and a hydroxyl group, wherein Component A is represented by Formula (A-1), $$\{R^2_q(R^1O)_pSi\}_m—X \quad (A\text{-}1)$$

wherein p and q are integers of 1 or 2, p+q being 3 is satisfied, m is an integer of 1 to 10, X denotes an m-valent linking group, $R^1$ denotes a hydrogen atom or an alkyl group, and $R^2$ denotes an alkyl group and wherein Component B is represented by Formula (B-1):

$$\{(R^3O)_3Si\}_n—Y \quad (B\text{-}1)$$

wherein n is an integer of 1 to 10, Y denotes an n-valent linking group, and $R^3$ denotes a hydrogen atom or an alkyl group.

11. A process for making a relief printing plate comprising:

a layer formation step of forming a relief-forming layer from a resin composition;

a crosslinking step of thermally crosslinking the relief-forming layer so as to form a crosslinked relief-forming layer; and an engraving step of laser-engraving the crosslinked relief-forming layer so as to form a relief layer, wherein the resin composition comprises:

two or more types of compounds selected from the group consisting of (Component A) a compound which comprises at least one silicon atom having a total of one or two groups selected from the group consisting of an alkoxy group and a hydroxyl group, (Component B) a compound which comprises at least one silicon atom having a total of three groups selected from the group consisting of an alkoxy group and a hydroxyl group, and (Component C) a compound which comprises a silicon atom having a total of four groups selected from the group consisting of an alkoxy group and a hydroxyl group, wherein Component A is represented by Formula (A-1), $$\{R^2_q(R^1O)_pSi\}_m—X \quad (A\text{-}1)$$

wherein p and q are integers of 1 or 2, p+q being 3 is satisfied, m is an integer of 1 to 10, X denotes an m-valent linking group, $R^1$ denotes a hydrogen atom or an alkyl group, and $R^2$ denotes an alkyl group and wherein Component B is represented by Formula (B-1):

$$\{(R^3O)_3Si\}_n—Y \quad (B\text{-}1)$$

wherein n is an integer of 1 to 10, Y denotes an n-valent linking group, and $R^3$ denotes a hydrogen atom or an alkyl group.

12. The process for making a relief printing plate according to claim 11, wherein it further comprises a rinsing step of rinsing the engraved relief layer surface with water or a liquid containing water as a main component.

13. The process for making a relief printing plate according to claim 12, wherein the liquid containing water as a main component comprises an amphoteric surfactant.

14. The relief printing plate precursor according to claim 1, wherein m in Formula (A-1) is an integer of 2 to 10.

15. The relief printing plate precursor according to claim 1, wherein n in Formula (B-1) is an integer of 1.

16. The relief printing plate precursor according to claim 1, wherein X in Formula (A-1) denotes an aliphatic group, an aromatic group, a heterocyclic group, an ether bond, a sulfur atom, an imino group of the structure —N(R)—, a carbonyl group, a sulfinyl group, a sulfonyl group, or a combination thereof, and R denotes a hydrogen atom, an alkyl group, an aryl group, an alkenyl group, an alkynyl group, an aralkyl group, or a divalent linking group formed by further removing one hydrogen atom from R.

17. The relief precursor printing plate according to claim 1, wherein Y in Formula (B-1) denotes an aliphatic group, an aromatic group, a heterocyclic group, an ether bond, a sulfur atom, an imino group of the structure —N(R)—, a carbonyl group, a sulfinyl group, a sulfonyl group, or a combination thereof, and R denotes a hydrogen atom, an alkyl group, an aryl group, an alkenyl group, an alkynyl group, an aralkyl group, or a divalent linking group formed by further removing one hydrogen atom from R.

18. The relief printing plate precursor according to claim 3, wherein Y has 2 to 200 carbons.

19. The relief printing plate precursor according to claim 5, wherein the hydroxy group-containing crosslinking polymer is polyvinyl alcohol or derivatives thereof.

20. The resin composition relief printing plate precursor according to claim 14, wherein n in Formula (B-1) is an integer of 1.

21. The relief printing plate precursor according to claim 16, wherein Y in Formula (B-1) denotes an aliphatic group, an aromatic group, a heterocyclic group, an ether bond, a sulfur atom, an imino group of the structure —N(R)—, a carbonyl group, a sulfinyl group, a sulfonyl group, or a combination thereof, and R denotes a hydrogen atom, an alkyl group, an aryl group, an alkenyl group, an alkynyl group, an aralkyl group, or a divalent linking group formed by further removing one hydrogen atom from R.

* * * * *